(12) United States Patent
Tiong et al.

(10) Patent No.: US 6,539,520 B1
(45) Date of Patent: Mar. 25, 2003

(54) SYSTEMS AND METHODS FOR GENERATING HARDWARE DESCRIPTION CODE

(75) Inventors: Spencer Hao Tiong, Singapore (SG); Alvin Swee Hock Lim, Singapore (SG)

(73) Assignee: Advanced Micro Devices, Inc., Sunnyvale, CA (US)

(*) Notice: Subject to any disclaimer, the term of this patent is extended or adjusted under 35 U.S.C. 154(b) by 128 days.

(21) Appl. No.: 09/724,134

(22) Filed: Nov. 28, 2000

(51) Int. Cl.[7] .......................... G06F 17/50; G06F 15/16; G06F 9/45
(52) U.S. Cl. .............................. 716/3; 716/18; 707/101; 707/102; 707/104.1; 707/513; 709/203; 717/106; 717/114; 717/140
(58) Field of Search .......................... 716/1–21; 707/10, 707/100–102, 103 R, 103 Y, 103, 104.1, 513; 709/200–253; 710/1–74; 717/106–109, 136–162, 114–119

(56) References Cited

U.S. PATENT DOCUMENTS

| | | | | |
|---|---|---|---|---|
| 5,682,392 A | * | 10/1997 | Raymond et al. | 714/727 |
| 5,815,683 A | * | 9/1998 | Vogler | 709/217 |
| 5,966,707 A | * | 10/1999 | Van Huben et al. | 707/10 |
| 6,157,947 A | * | 12/2000 | Watanabe et al. | 709/217 |
| 6,226,780 B1 | * | 5/2001 | Bahra et al. | 716/18 |
| 6,289,489 B1 | * | 9/2001 | Bold et al. | 716/1 |
| 6,292,925 B1 | * | 9/2001 | Dellinger et al. | 716/8 |
| 6,298,319 B1 | * | 10/2001 | Heile et al. | 703/26 |
| 6,324,672 B1 | * | 11/2001 | Lawman et al. | 716/1 |
| 6,366,874 B1 | * | 4/2002 | Lee et al. | 703/14 |
| 6,421,818 B1 | * | 7/2002 | Dupenloup et al. | 716/18 |

OTHER PUBLICATIONS

Bogliolo et al., ("Gate–Level Power and Current Simulation of CMOS Integrated Circuits", IEEE Transactions on Very Large Scale Integration (VLSI) Systems, vol. 5, No. 4, Dec. 1997, pp. 473–488).*
Vassileva et al. ("Virtual VHDL laboratory", 1998 IEEE International Conference on Electronics, Circuits and Systems, vol. 3, Sep. 7, 1998, pp. 325–328).*
Olcoz et al. ("VLDL teamwork, organization units and workspace management", Proceedings of Automation and Test in Europe, Feb. 23, 1998, pp. 297–302).*
Yang et al. ("IVE: an Internet based distributed VHDL environment", Proceedings of 13th Annual ASIC/SOC Conference, Sep. 13, 2000, pp. 131–135).*
Sun Microelectronics, "microSPARC–IIep™", Introduction to JTAG Boundary Scan, White Paper, Jan., 1997, 10 pp.
BCAD User's Guide, Lucent Technologies—Bell Laboratories, Release 4.0, Dec., 1999, 24 pp.

* cited by examiner

Primary Examiner—Matthew Smith
Assistant Examiner—Phallaka Kik
(74) Attorney, Agent, or Firm—Eschweiler & Associates, LLC

(57) ABSTRACT

An Internet hardware description code generation system, methods, and scripts are provided. The Internet hardware description code generation system includes a hardware description code generation host adapted to generate one or more hardware description language files in response to one or more input parameters. A user uploads input parameters corresponding to a circuit to the hardware description code host. In response, the host generates one or more hardware description language (HDL) files that describe the circuit. Cgi scripts may be used to generate the HDL files.

36 Claims, 23 Drawing Sheets

INPUT PARAMETERS

EXAMPLE OF THE FORMAT OF THE INPUT FILE

1. The input file can be a text file of any extension
2. The ports listed must be in their correct sequence
3. The contents must follow the following format

| PORT NAME | PIN ID | PORT TYPE | BSC NUM | CELL TYPE | SAFE VAL | CNTL VAL | DIS VAL | RES VAL | ALT NAME | BUF NAME | ASSOC ELEM |
|---|---|---|---|---|---|---|---|---|---|---|---|
| MYTOK | A1 | TCK | | | | | | | | buf=BIN10F | assoc=PU20K |
| MYTRST | A4 | TRST | | | | | | | | buf=BIN10F | assoc=PU20K |
| IN | A6 | | | BC_3 | X | | | | | buf=BIN10F | assoc=PU20K |
| SYSCLK | A7 | clock | | BC_4 | X | | | | name=clk | buf=BIN10F | assoc=PU20K |
| OUTA(7) | D26 | out2 | | BC_1 | 0 | | | | | buf=BON10F | assoc=PD20K |
| OUTA(8) | D27 | out3 | | BC_1 | 0 | | | | | buf=BON10F | assoc=PD20K |
| MALLARD | M9 | in | | BC_4 | X | | | | | buf=BIN10F | assoc=PU20K |
| QUA | CK0 | clock | | BC_4 | X | | | | | buf=BIN10F | assoc=PU20K |

4. The space between each field can be either a single white space or a tab space
5. You can see the VERILOG code generated from the above example <u>here</u>
6. A more detailed explanation of the format of the input file is given <u>here</u>

C:\WINNT\PROFILES\sgpsign\Desktop\input    BROWSE

Upload File    Reset

INPUT PARAMETERS

ENTER PORT DESCRIPTIONS USING THE PULL DOWN MENUS BELOW

| PLEASE ENTER THE TOTAL NUMBER OF PORTS |

NUMBER OF PORTS  4  ▼  — 480

| PLEASE ENTER THE PORT NAMES IN THEIR CORRECT SEQUENCE |

PORT NAME  MYTOK  ▼  — 480
PORT NAME  MYTRST  ▼  — 480
PORT NAME  IN  ▼  — 480
PORT NAME  ▼  — 480

OUTA(7)
OUTA(8)
SYSCLK
QUA

SUBMIT      RESET
       — 500

INPUT PARAMETERS

ENTER PORT DESCRIPTIONS USING THE PULL DOWN MENUS BELOW

PLEASE ENTER THE PORT NAMES IN THEIR CORRECT SEQUENCE

475" → PORT NAME | MYTOK | ▼ / 480"
475" → PORT NAME | MYTRST | ▼ / 480"
475" → PORT NAME | IN | ▼ / 480"
475" → PORT NAME | | ▼ / 480"

OUTA(7)
OUTA(8)
440'" — SYSCLK
QUA

SUBMIT          RESET

THE INPUT FILE C:\WINNT\Profiles\sgpsign\Desktop\input HAS BEEN SUCCESSFULLY UPLOADED!

If you want to create a verilog netlist from the file you have just uploaded, please click on the button below and save the generated netlist as a file.

530

↖ 540

THE INPUT FILE C:\WINNT\Profiles\sgpsign\Desktop\input HAS BEEN SUCCESSFULLY UPLOADED!

If you want to create a verilog netlist from the file you have just uploaded, please click on the GENERATE VERILOG NETLIST button below.

To save the generated netlist as a file, please click on the SAVE VERILOG NETLIST button below.

550

SYSTEMS AND METHODS FOR GENERATING HARDWARE DESCRIPTION CODE

REFERENCE TO COMPUTER PROGRAM LISTING APPENDICES

Two (2) duplicate compact discs, each containing two files named "App_a.txt" and "App_b.txt", corresponding respectively to Appendix A and Appendix B, are incorporated herein by reference.

The present invention relates generally to generating hardware description language code, and more particularly to systems and methods for generating boundary scan configuration files and VERILOG netlists.

BACKGROUND OF THE INVENTION

To reduce the cost of device component and system testing, integrated circuits (ICs) and printed circuit boards (PCBs) often have built-in-self-test (BIST) features incorporated into the components. To standardize the test methodology and port architecture, the Joint Test Access Group (JTAG) created the Institute for Electrical and Electronic Engineers (IEEE) standard 1149.1, also known as IEEE Standard Test Access Port and Boundary Scan Architecture. IEEE standard 1149.1 defines a four to five wire serial interface, an instruction set, and a test protocol. The test port of an 1149.1 standard device allows for serial loading of test instructions and data into the device, and for the test results to be serially read out.

JTAG Compliant Device Architecture

FIG. 1 illustrates an IEEE 1149.1 compatible device 10. A JTAG compatible device has a four pin test port (TCK=Test Clock 20, TMS=Test Mode Select 30, TDI=Test Data In 40, and TDO=Test Data Out 50), an optional $5^{th}$ reset pin (TRST=Test Reset 60), a Test Access Port (TAP) Controller 70, an Instruction Register (IR) 80, a Bypass register (BPR) 90, a Boundary Scan Register (BSR) 100, and an optional user Data Register (DR) 110. Each input and output pin of a 1149.1 compatible device has a Boundary Scan Cell (BSC) 120 and 122, which contains a set of control registers and gates (not shown). The boundary scan register or BSR 100 is made up of serially connected BSCs 120 and 122 as illustrated in FIG. 1. Serially connected BSCs 120 and 122 are also called the scan path. The boundary scan chain is the path from TDI 40, through the BSR 100, to TDO 50.

The TAP controller 70 is a state machine that, in conjunction with the IR 80, controls operations associated with the BSR 100. The TAP controller 70 is clocked by TCK 20, and its state is controlled by TMS 30. TDI 40 and TDO 50 receive the data input and output signals for the boundary scan chain. Working in conjunction with the TAP controller 70, the IR 80 is loaded with instructions that determine the particular test to be performed.

There are three required test instructions defined by IEEE Std 1149.1, BYPASS, SAMPLE/PRELOAD, and EXTEST. The BYPASS instruction keeps the IC in a functional mode, and enables serial data to pass through the IC from TDI 40 through the BPR 90 to TDO 50 without affecting the operation of the rest of the device. The SAMPLE/PRELOAD instruction keeps the IC in its functional mode, and selects BSR 100 to be connected between TDI 40 and TDO 50. Executing SAMPLE/PRELOAD instruction allows the BSR 100 to be accessed to sample the data entering and leaving the IC or to preload test data into the BSR 100. The EXTEST instruction places the IC into a test mode, and selects the BSR 100 to be connected between TDI 40 and TDO 50. Executing EXTEST loads the BSCs 122 associated with output pins 130 with the test patterns to be input into downstream devices, and prepares the input boundary cells 120 to capture the input data.

VERILOG Netlist and Boundary Scan Description Language Files

A hardware description language (HDL) is a code for describing a circuit. A primary use of HDLs is the simulation of designs before the designer must commit to fabrication. The two most popular HDLs are VHSIC Hardware Description Language (VHDL) and VERILOG. VHDL was developed by the U.S. Department of Defense and is an open standard. VERILOG, also called Open VERILOG International (OVI), is an industry standard developed by a private entity, and is now an open standard referred to as IEEE Standard 1364. A file written in VERILOG code that describes a JTAG compliant device is called a VERILOG netlist. VHDL is an HDL defined by IEEE standard 1076.1. Boundary Scan Description Language (BSDL) is a subset of VHDL, and provides a standard machine- and human-readable data format for describing how an IEEE Std 1149.1 boundary-scan architecture is implemented and operates in a device.

Commercial products exist that generate the boundary scan description language (BSDL) files and VERILOG netlists. To generate a BSDL file, such products generally require input files with many parameters and must be composed using exact syntax. For instance, a BSDL description for a device consists of several elements. These elements include entity descriptions, a generic parameter, a logical port description, use statement(s), a component conformance statement, pin mapping(s), a scan port identification, an instruction register description, an optional register description, a register access description, and a boundary register description. Some products require an input file containing a register transfer language (RTL) representation of the device, such as a VERILOG or VHDL description. Other products require an input file with device parameters specified by a manufacturer defined syntax. To generate the files in the proper format requires learning the various programming languages or manufacturer defined syntax. When the files are created, even small errors in syntax can result in time-consuming debugging of the input files. Consequently, generating the input files that describe the boundary scan architecture is time-consuming and requires a skilled programmer. Thus, the current systems and methods of generating VERILOG netlists and BSC files are labor intensive, prone to inaccuracies, and slow. Systems and methods of improving the speed, accuracy, and simplicity of generating HDL files are needed.

SUMMARY OF THE INVENTION

The present invention includes systems, methods, scripts, and signals useful for generating hardware description language (HDL) files that describe circuits. To generate an HDL file, a user may access a hardware description code generation host, typically via the Internet, and upload information about the circuit. The hardware description code generation host may in turn generate an HDL file from the uploaded information, referred to as the input parameters, which the user uploads to the host. The hardware description code generation host utilizes scripts, which are generally software programs, to generate the files from the input parameters. The input parameters contain information about the ports of the device, which are utilized in generating the files. Information about the format for entering the input parameters may be displayed to the user on the same webpage as the input form, or through a separate webpage easily accessible by clicking on hyperlinks to other webpages. Moreover, the user may customize the input format to suit his particular needs. After the hardware description language files are generated, the user may save or download the files from the host.

The present invention has several advantages over the prior art. First, the present invention eliminates the labor intensive processes of learning the HDL syntax and debugging the HDL files to correct syntax errors. Instead of having to learn an HDL-like VERILOG or BSDL to generate HDL files, the user will input simple port descriptions and the script will generate the files. Second, the details of the input format for entering the input parameters may be displayed on the input form, which will eliminate the need to memorize the input format, or the cumbersome process of referring to a manual to learn formatting details. The present invention even allows a user to customize the input format to his own needs. Third, since VERILOG netlists and BSDL files differ significantly, a user typically generates each separately. The present invention allows both the VERILOG netlist and the BSDL files to be generated from one file of input parameters, again, eliminating a labor intensive process. Thus, the systems and methods of the present invention improve the speed, accuracy, and simplicity of hardware description code generation, and overcome the limitations and shortcomings of the prior art.

In accordance with one aspect of the present invention an Internet hardware description code generation system is provided. The Internet hardware description code generation system includes a hardware description code generation host. The hardware description code generation host is adapted to generate one or more hardware description language files in response to one or more input parameters uploaded thereto. The one or more input parameters may describe a circuit, and these parameters may include one or more port descriptions. The circuits described by the input parameters may include circuits that have at least one device that complies substantially with IEEE standard 1149.1, circuits that have at least one boundary scan cell, at least one test access port controller, at least one bypass register, and at least one instruction register, and circuits that have at least one boundary scan chain.

The one or more input parameters may be uploaded to the hardware description code generation host via the Internet. An input format for inputting the one or more input parameters may be displayed to a user substantially simultaneously as the user inputs the input parameters. The input format for inputting the one or more input parameters may be pre-defined or customized by a user. The input form may be an HTML form. The hardware description code generation host may utilize at least one script for customizing an input form for inputting the one or more input parameters.

The hardware description code generation host may be a computer. The hardware description code generation host may utilize at least one script for generating the one or more hardware description language files. At least one of the one or more hardware description language files generated may be a VERILOG netlist or a boundary scan configuration file, and may be generated in VHSIC Hardware Description Language, a Boundary Scan Description Language or in VERILOG. The present invention also includes hardware description language files generated by the Internet hardware description code generation systems described herein.

In accordance with one aspect of the present invention an Internet hardware description code generation method is provided. The Internet hardware description code generation method includes interfacing a user and a hardware description code generation host, receiving one or more input parameters describing a circuit from the user, and generating one or more hardware description language files from the one or more input parameters received from the user. The one or more input parameters may include one or more port descriptions. The circuits described by the input parameters may include circuits that have at least one device that substantially complies with IEEE standard 1149.1, circuits that have at least one boundary scan cell, at least one test access port controller, at least one bypass register, and at least one instruction register, and circuits that have at least one boundary scan chain. The user and the hardware description code generation host may be interfaced via the Internet. The user may download the one or more hardware description language files from the hardware description code generation host, and/or the one or more hardware description language may be stored on data storage media.

The hardware description code generation host may be a computer. The hardware description code generation host may utilize at least one script for generating the one or more hardware description language files. At least one of the one or more hardware description language files generated may be a VERILOG netlist or a boundary scan configuration file. The hardware description code generation host may include data storage media for storing the hardware description language files. The hardware description code generation host may utilize at least one script for generating the one or more hardware description language files.

An input format for inputting the one or more input parameters may be displayed to a user substantially simultaneously as the user inputs the input parameters. The input format for inputting the one or more input parameters may be pre-defined or customized by a user. The input form may be in an HTML format. The hardware description code generation host may utilize at least one script for customizing an input form for inputting the one or more input parameters. The user may use a computer to link to the hardware description code generation host via the Internet to upload the one or more input parameters to the hardware description code generation host. The present invention also includes hardware description language files generated by the Internet hardware description code generation methods described herein.

In another aspect of the present invention, an electronic signal adapted to be transmitted between at least two computers is provided. The electronic signal includes one or more input parameters describing a circuit. The one or more input parameters may be received by a hardware description code generation host, and the hardware description code generation host may generate one or more hardware description language files from the one or more input parameters. The electronic signal may be stored in electronic memory, such as random access memory.

In yet another aspect of the present invention, an electronic signal adapted to be transmitted between at least two computers is provided. The electronic signal includes one or more hardware description language files describing a circuit. The one or more hardware description language files may be generated from one or more input parameters that are received by a hardware description code generation host.

The electronic signal may be stored in electronic memory, such as random access memory.

To the accomplishment of the foregoing and related ends, the invention comprises the features hereinafter fully described and particularly pointed out in the claims. The following description and the annexed drawings set forth in detail certain aspects and embodiments of the invention. These aspects and embodiments are indicative, however, of but a few of the various ways in which the principles of the invention may be employed. Other objects, advantages, and novel features of the invention will become apparent from the following detailed description of the invention when considered in conjunction with the drawings.

BRIEF DESCRIPTION OF THE DRAWINGS

FIG. 3b is a schematic illustration of a webpage in accordance with one aspect of the present invention.

FIG. 3k is a schematic illustration of a webpage providing an input form in accordance with one aspect of the present invention.

FIG. 3l is a schematic illustration of a webpage in accordance with one aspect of the present invention.

DETAILED DESCRIPTION OF THE INVENTION

Figure 1:
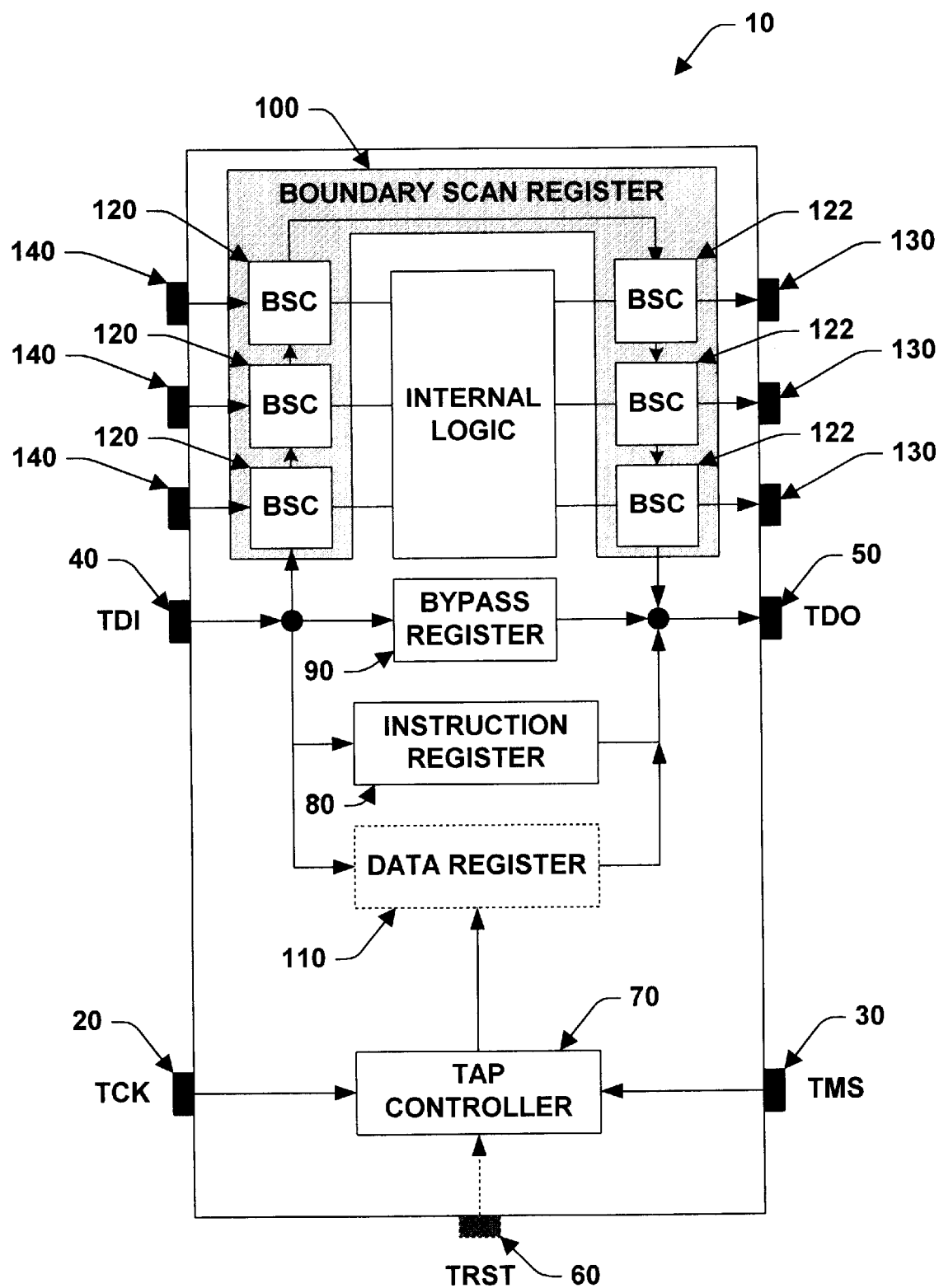
FIG. 1 is a schematic illustration of a JTAG compliant device.

The following is a detailed description of the present invention made in conjunction with the attached figures, wherein like reference numerals will refer to like elements throughout. The invention provides web-based code generation systems, methods, and scripts capable of generating HDL description files.

Figure 2A:
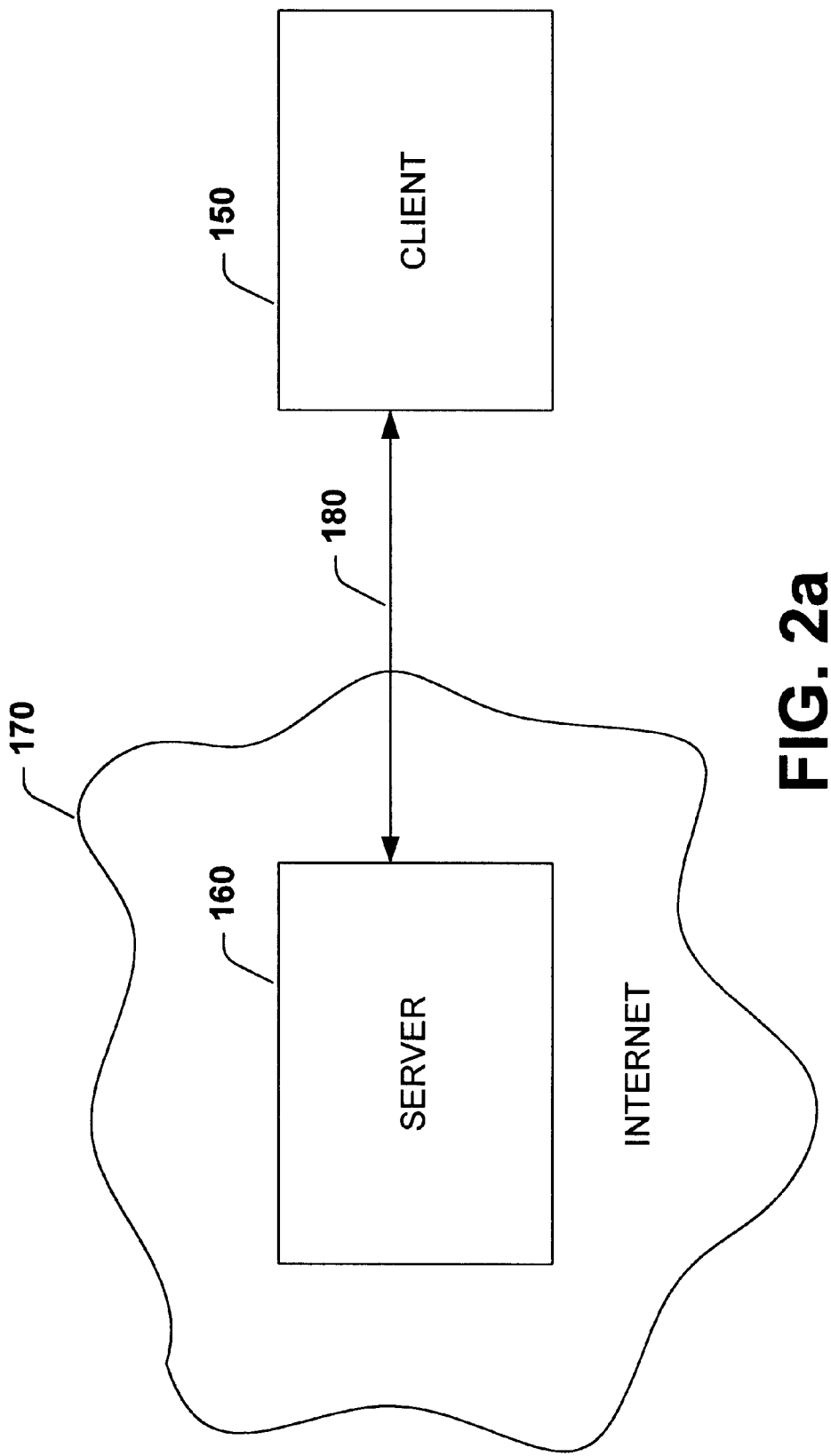
FIG. 2a is a schematic illustration of a client and server in accordance with one aspect of the present invention.

FIG. 2a is a schematic block diagram that depicts one aspect of the present invention. A client computer system 150 is shown connected to a server computer system 160 that is part of the Internet 170 (the World Wide Web, "www"). The client 150 and server 160 are connected by a data connection 180. The client 150 and server 160 can be connected by any system or method capable of connecting at least two computer systems for the transfer of data over the Internet. For example, the client 150 and server 160 can be connected to the Internet via a phone network, for example, such as those provided by a local or regional telephone operating company, or a coaxial cable line. The data connection 180 may also be provided by dedicated data lines, Personal Communication Systems ("PCS"), microwave, satellite networks, wireless telephones, for example, or any suitable means. It is to be understood that the terms client and server are to be construed in the broadest sense, and that all such constructions of the terms are intended to fall within the scope of the hereto appended claims.

The present invention advantageously makes use of standard Internet protocols including TCP/IP and HTTP. TCP/IP is a common transport layer protocol used by a worldwide network of computers. HTTP is a known application protocol that provides users access to files (which can be in different formats such as text, graphics, images, sound, video, etc.) using a standard page description language known as Hypertext Markup Language (HTML), DHTML or XML. Known HTML web browsers allow for graphical user interface (GUI) based access to HTML documents accessible on servers communicatively linked to the client. These documents are commonly referred to as "web pages". Although the client 150 and the server 160 are coupled together via the Internet 170, the invention may also be implemented over other public or private networks or may be employed through a direct connection and any such communication implementation is contemplated as falling within the scope of the present invention.

Figure 2B:
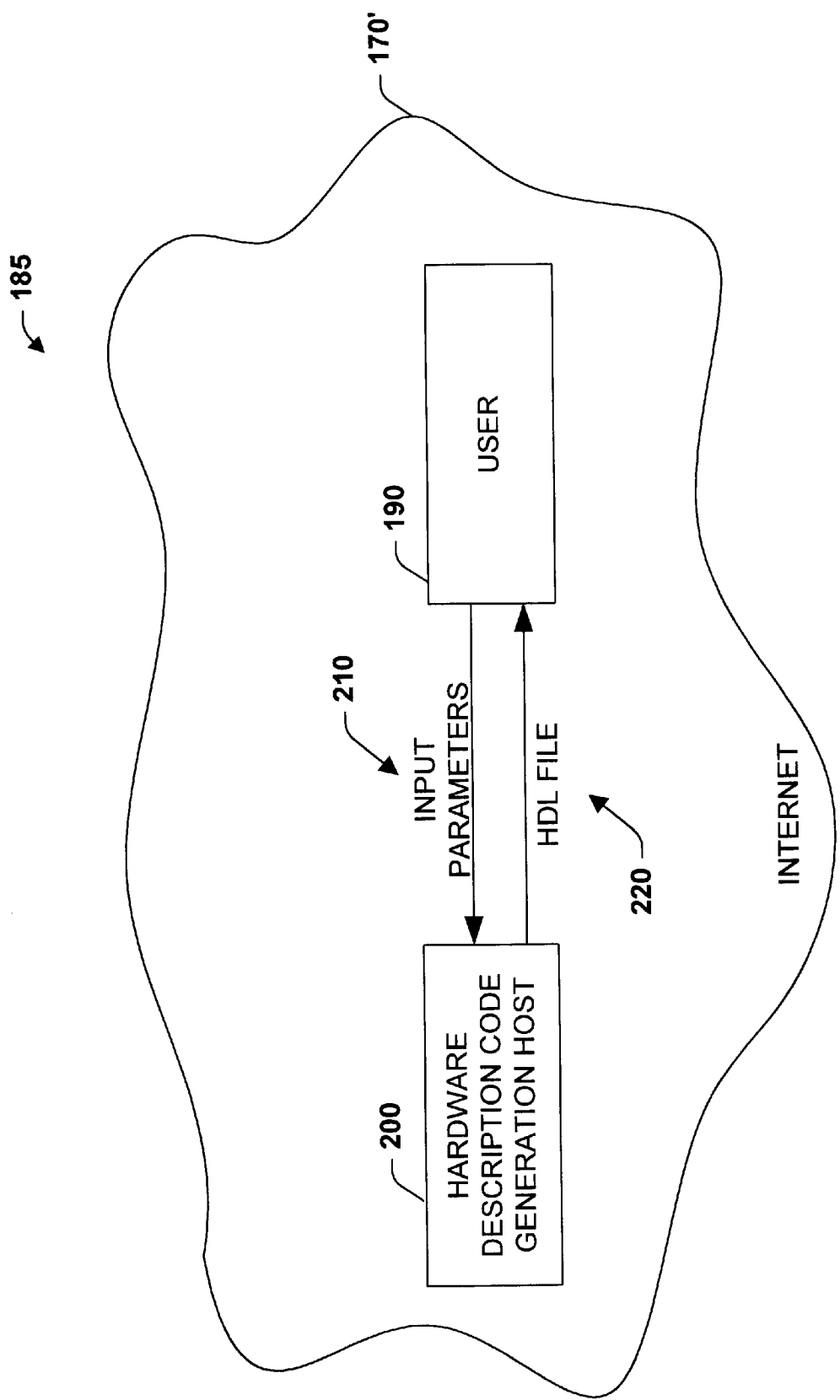
FIG. 2b is a schematic illustration of an Internet hardware description code generation system in accordance with one aspect of the present invention.

FIG. 2b is a schematic illustration of a system 185 of the present invention. The system 185 includes at least two entities, a user 190 and a hardware description code generation host 200, operatively interfacing with each other over the Internet 170'. In another aspect of this system 185, multiple users (not shown) can operatively interface with the hardware description code generation host 200. The user 190 desires to generate an HDL file that describes a circuit using the hardware description code generation host 200, typically for a fee. The circuit described may be an IEEE standard 1149.1 compliant device, a device that includes at least one boundary scan cell, at least one test access port controller, at least one bypass register, and at least one instruction register, a device that includes at least one boundary scan chain, or any other device. The user 190 may upload input parameters 210 to the hardware description code generation host 200. In response, the hardware description code generation host 200 may generate an HDL file 220 using the input parameters 210. The HDL file 220 may be a VERILOG netlist, a BSC file, a VHDL file, a BSDL file, or a file in any format or language suitable for describing circuits. It is to be appreciated that the term "VERILOG" encompasses all versions of VERILOG, including OVI and those promulgated by IEEE standard 1364. It is to be appreciated that the HDL files 220 generated by the host 200 can be in an electronic format. It will also be appreciated that any means of storing data may be used in the present invention to store the HDL descriptions, such as magnetic media, optical storage media, RAM, ROM, etc.

To facilitate the interaction, the hardware description code generation host 200 may provide a website that allows the user 190 to input and receive information utilizing a browser. The website may include HTML forms for entering data, such as fill-in forms and/or pull down menus. The website may also include webpages with information on input format and file download instructions. The hardware description code generation host 200 may be a computer, such as a single personal computer ("PC"), electronic node, server, database, or any future technological innovation that can receive, process, and transmit data.

Figure 2C:
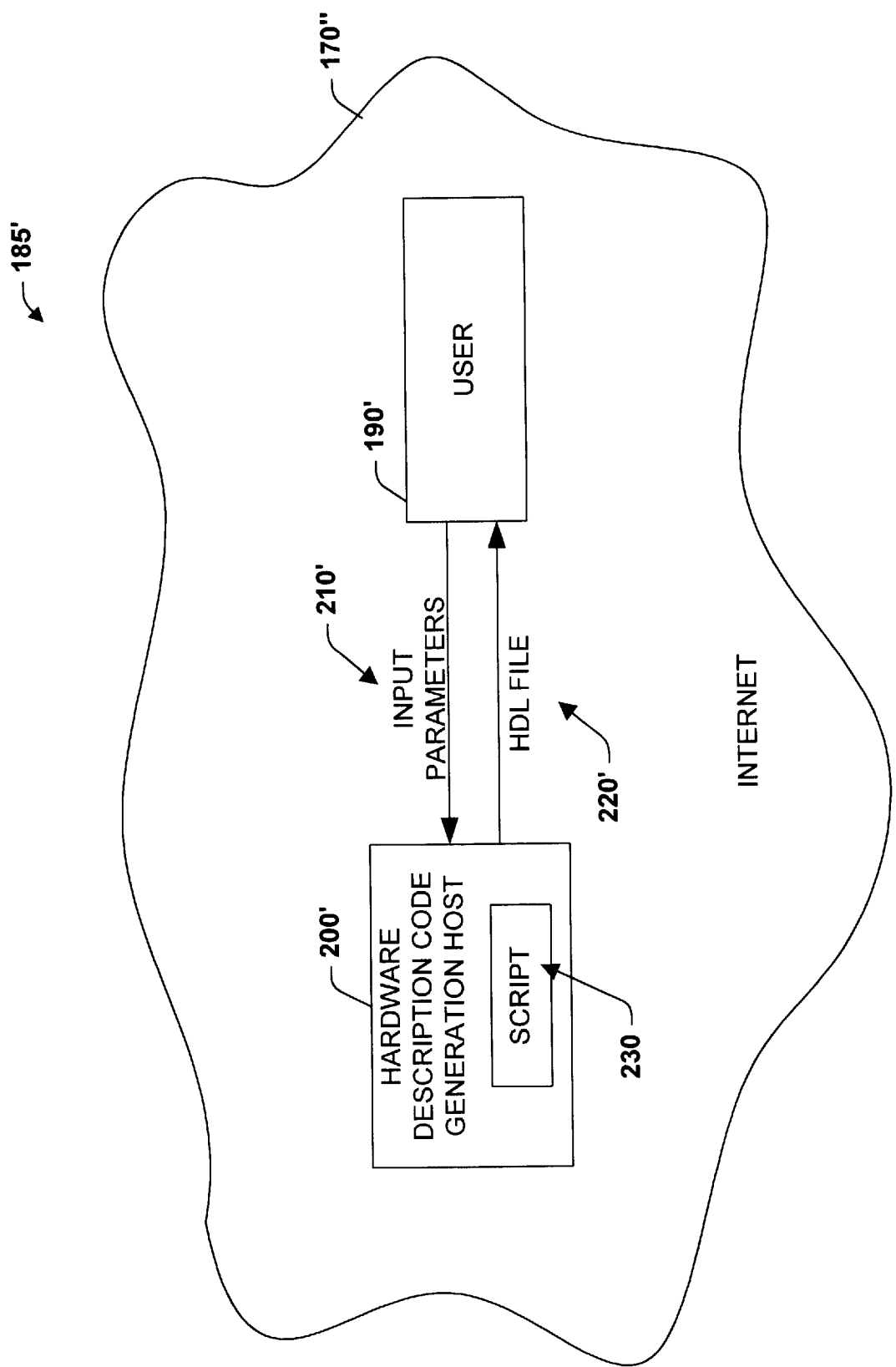
FIG. 2c is a schematic illustration of an Internet hardware description code generation system in accordance with one aspect of the present invention.

In FIG. 2c another aspect of the present invention is illustrated. In this system 185', the hardware description code generation host 200' includes a script 230 for generating the HDL files 220'. Scripts include common gateway interface (cgi) scripts. Cgi is a specification for transferring information between a www server and a cgi script. A cgi script is any software program designed to accept and return data that adheres to the cgi specification. The cgi program may be written in any programming language, including higher level languages such as C++, Perl, Java, ActiveX, or Visual Basic. HTML pages that include forms, such as a fill-in form and/or a pull down menu, may use a cgi program to process the form's data. The scripts of the present invention may be implemented by any suitable manner, including loading the memory of a computer with a software program that implements an algorithm for converting the input parameters 210' to HDL files 220'. The user 190' operatively interfaces with the script 230 over the Internet 170", or alternatively, by any suitable means such as dedicated data lines, PCS, microwave, satellite networks, wireless telephone, or locally such as by a local area network or desktop computer.

Figure 2D:
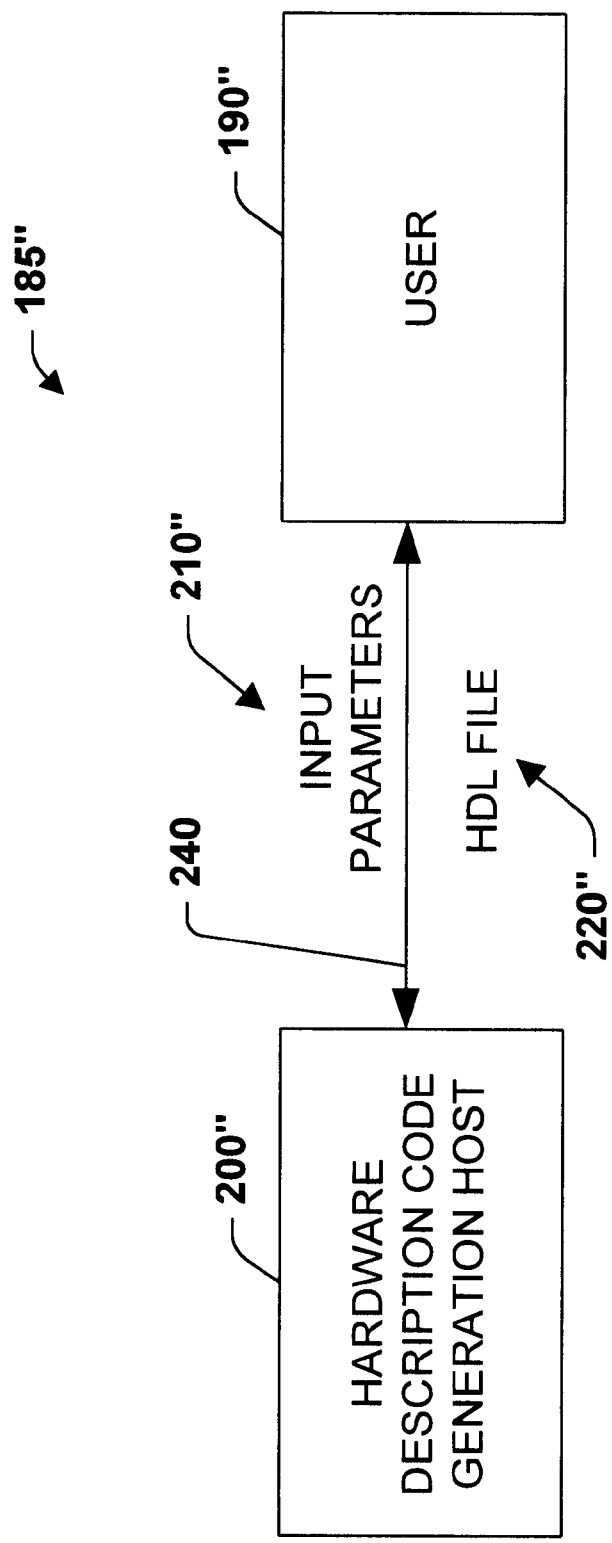
FIG. 2d is a schematic illustration of an Internet hardware description code generation system in accordance with one aspect of the present invention.

FIG. 2d is a schematic representation of another system 185" for carrying out the present invention. This system 185" is similar to the system 185 of FIG. 2b, however, the user 190" and the hardware description code generation host 200" do not interface over the Internet. The system 185" may be practiced in any suitable manner, for instance by a dedicated data line 240.

Figure 2E:
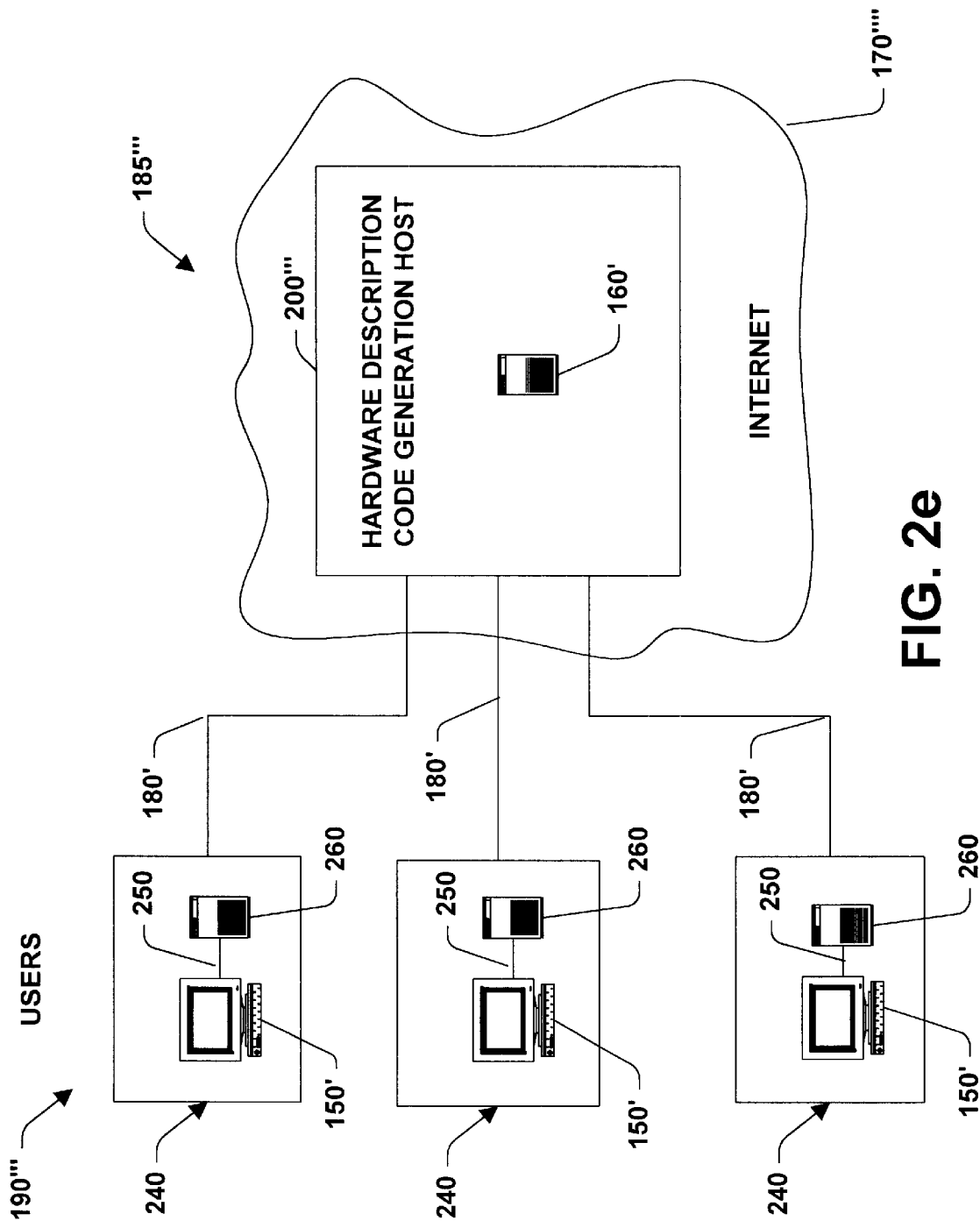
FIG. 2e is a schematic illustration of an Internet hardware description code generation system in accordance with one aspect of the present invention.

FIG. 2e is a system 185''' for carrying out the present invention. The system 185''' includes multiple users 190''' that are communicatively linked to a hardware description code generation host 200'''. The multiple users 190''' may be linked to the hardware description code generation host 200''' in any manner suitable for exchanging information in accordance with the present invention. For instance, in FIG. 2e, each of the users 190''' is shown to be part of a separate entity that includes one or more respective computer systems 240. The computer systems 240 may include a client 150', such as a desktop or laptop computer, operatively coupled to a LAN interface for communicating over a network backbone 250 to a local server 260. The local server 260, in turn, interfaces with the hardware description code generation host 200'''. Typically this interface is through a server 160', and is via a connection to the Internet 170"", such as by a telephone line using a modem, a wireless local area network, and/or a wide area network, etc.

It will be appreciated that while FIG. 2e depicts the client 150' and the server 160' communicating with the hardware description code generation host 200''' via the Internet 170"", alternatively, the client 150' and the server 160' may interface through hardwired network connections, such as a network cable or the like. Although the users 190''' and the hardware description code generation host 200''' are shown in FIG. 2e to communicate via different computers 150', 260, and 160', it will be appreciated that the users 190''' and the hardware description code generation host 200''' may interface via the same computer system (not shown). Moreover, while the FIG. 2e shows only one hardware description code generation host 200''', it will be appreciated that a plurality of hardware description code generation hosts may interface with each other and with a plurality of users (not shown).

Figure 2F:
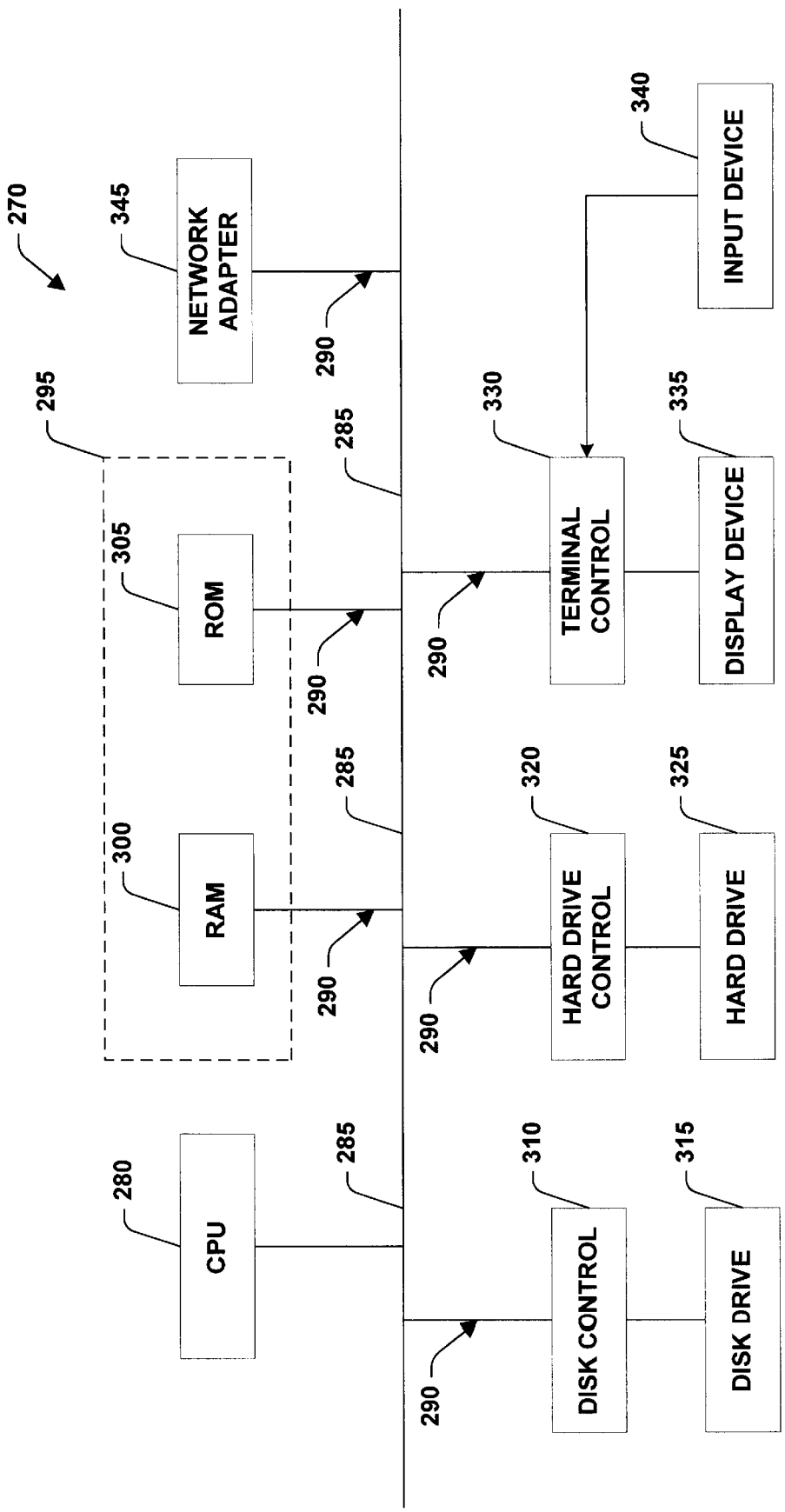
FIG. 2f is a block diagram schematically illustrating a computer in accordance with one aspect of the present invention.

FIG. 2f, is a detailed block diagram of a computer 270 in accordance with the present invention. The computer 270 may be employed in the systems and methodology of the present invention as either the client 150', server 160', and/or the local server 260. It is to be appreciated that a CPU or processor 270 with or without any other associated hardware can function as a computer, and is contemplated as within the scope of a computer by the present invention. It is also to be appreciated that the computers of the present invention, including the client computer system 150', the server computer system 160', or the local server computer system 260, may include a single computer system or a plurality of computer systems.

The computer system 270 includes a central processing unit (CPU) 280 which is coupled to a bus 285. The CPU or processor 280 can be any of a plurality of processors, such as the AMD Athlon, K-6, and any other processors. It will be appreciated that since the present invention provides for a multi-platform environment as described in greater detail below, any processor and/or computer suitable for carrying out the functions of the present invention may be employed. The processor 280 functions to perform various operations described herein, as well as any other operations related to the system 270. The manner in which the processor 280 can be programmed to carry out the functions relating to the present invention will be readily apparent to those having ordinary skill in the art based on the description provided herein.

The bus 285 includes a plurality of signal lines 290 for conveying addresses, data and controls between the CPU 280 and a number of other system bus components. The other system bus components include a memory 295 (including a Random Access Memory (RAM) 300, a Read Only Memory (ROM) 305) and a plurality of input/output (I/O) devices. The memory 295 serves as data storage and may store appropriate operating code to be executed by the processor 280 for carrying out the functions described herein. The processor 280 itself may include associated hardware, such as RAM or ROM and I/O devices.

The RAM 300 provides program instruction storage and working memory for the CPU 280. The ROM 305 contains software instructions known as the Basic Input/Output System (BIOS) for performing interface operations with the I/O devices. Also stored in the ROM 305 is a software routine which operates to load a boot program from the booting device. The boot program will typically be executed when the computer system 270 is powered on or when initialization of the system 270 is needed.

The I/O devices include basic devices such as data storage devices (e.g., floppy disks, tape drives, CD ROMs, hard disks). Typically, the I/O devices communicate with the CPU 280 by generating interrupts. The CPU 280 distinguishes interrupts from among the I/O devices through individual interrupt codes assigned thereto. Responses of the CPU 280 to the I/O device interrupts differ, depending, among other things, on the devices generating the interrupts. Interrupt vectors are provided to direct the CPU 280 to different interrupt handling routines.

The interrupt vectors are generated during initialization (e.g., boot up) of the computer system 270 by execution of the BIOS. Because responses of the CPU 280 to device interrupts may need to be changed from time to time, the interrupt vectors may need to be modified from time to time in order to direct the CPU 280 to different interrupt handling routines. To allow for modification of the interrupt vectors, they are stored in the RAM 300 during operation of the computer 270.

A disk control subsystem 310 bidirectionally couples one or more disk drives 315 (e.g., floppy disk drives, CD-ROM drives, etc.) to the system bus 285. The disk drive 315 works in conjunction with a removable storage medium such as a floppy diskette or CD-ROM. A hard drive control subsystem 320 bidirectionally couples a rotating fixed disk, or hard drive 325 to the system bus 285. The hard drive control subsystem 320 and hard drive 325 provide mass storage for CPU instructions and data.

A terminal control subsystem 330 is also coupled to the bus 285 and provides output to a display device 335, typically a cathode ray tube ("CRT") or liquid crystal display ("LCD") monitor, and receives inputs from an input device 340 such as a keyboard. Input may also be provided from a pointing device such as a mouse. A network adapter 345 is provided for coupling the system 270 to a network.

One of the implementations of the present invention is as several sets of instructions in a code module resident in the main memory (e.g., RAM 300). Until required by the computer 270, the sets of instructions may be stored in another computer memory, for example, in a hard disk drive, or in a removable memory such as an optical disk for eventual use in a CD-ROM or a floppy disk for eventual use in the floppy disk drive.

Figure 3A:
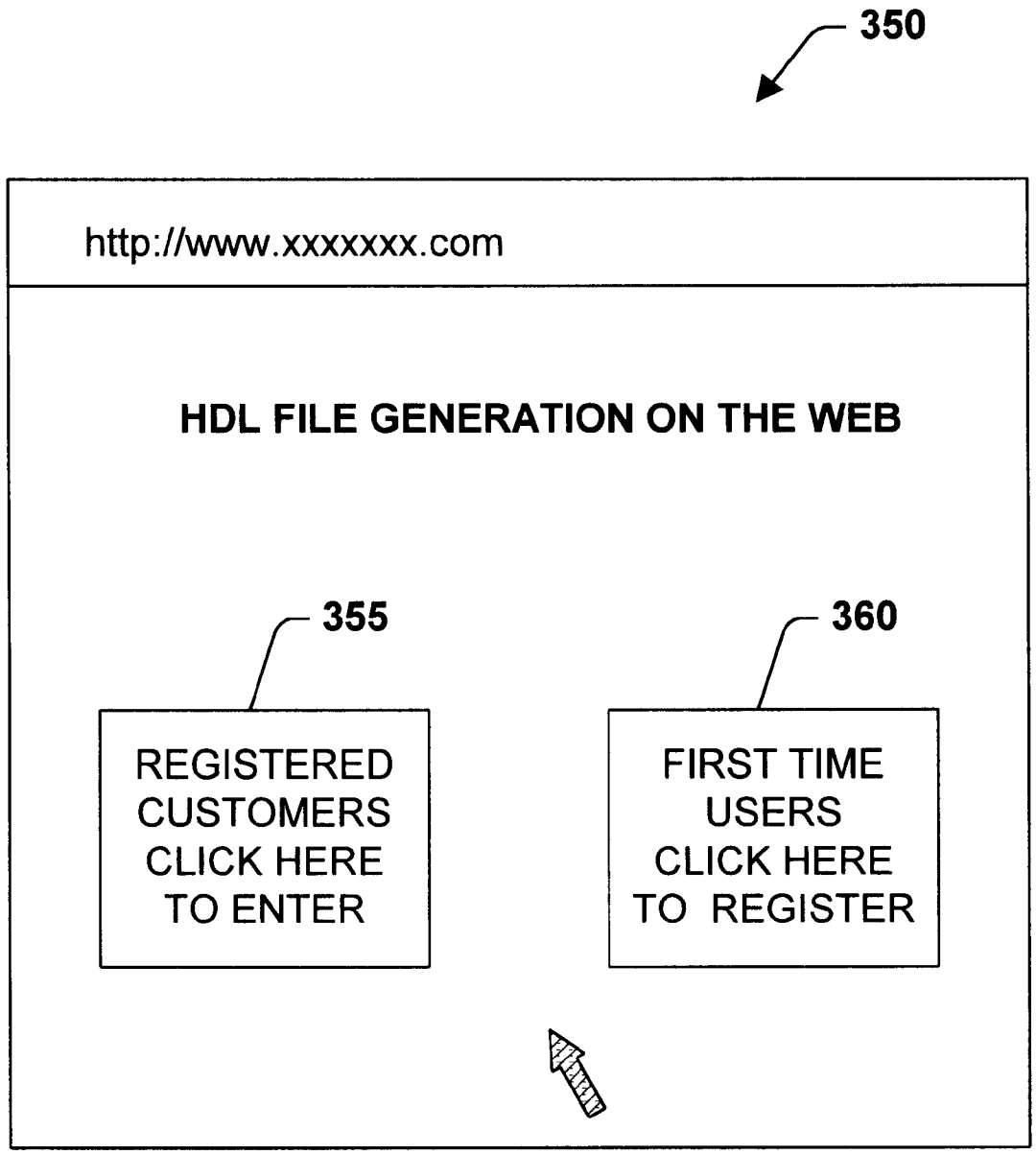
FIG. 3a is a schematic illustration of a webpage in accordance with one aspect of the present invention.

Turning now to FIG. 3a, an exemplary Internet webpage 350, which provides a graphical user interface between users and a hardware description code generation host, is shown. The webpage 350 is shown to include hyperlinks for handling both registered users 355 and unregistered first time users 360. For example, as shown in FIG. 3a, registered customers may select a hyperlink to a registered user login screen via hyperlink 355. Similarly, non-registered customers may select a hyperlink to a registration screen via hyperlink 360. While FIG. 3a illustrates separate hyperlinks for registered and first time users, such hyperlinks could alternatively be combined, and the status of the user could be determined during a later stage in the login procedure.

FIG. 3b illustrates a webpage 370 in accordance with one exemplary aspect of the present invention. As with all the exemplary webpages described herein, the webpages can be in any format or programming language, such as HTML, DHTML, XML, etc., suitable for creating and displaying a web page. When the webpage 370 is displayed, users may enter one or more input parameters that describe the device, such as parameters that describe the ports of the device. For instance, the user may enter port description parameters including a port name (PORT NAME) 380, a pin ID (PIN ID) 385, a port type (PORT TYPE) 390, a boundary scan cell number (BSC NUM) 395, a cell type (CELL TYPE) 400, a safe value (SAFE VAL) 405, a control cell (CNTL VAL) 410, a disable value (DIS VAL) 415, a result value (RES VAL) 420, an alternate signal name (ALT NAME) 425, a buffer name (BUF NAME) 430, and an associated element name (ASSOC ELEM) 435. As shown in FIG. 3b, the user may upload the input parameter values 440 via a pre-generated file 450. For example, the input file 450 may be selected by browsing the files on the user's computer hard drive using the "Browse" button 455, for example, by clicking on the button 455 with a computer mouse (not shown). The Browse feature 455 will allow a user to see a directory of the files on the user's computer hard drive so that the path to the input file may be selected. When the input file 450 is selected, for example, by clicking on the file name 450 with a computer mouse (not shown), the user then can select the "Upload File" button 456.

Figure 3C:
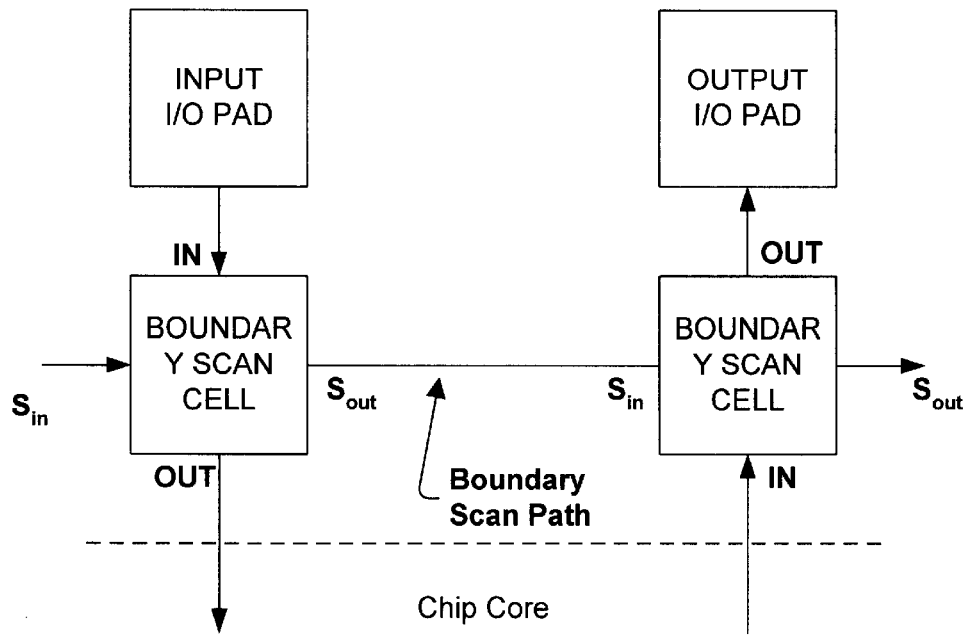
FIG. 3c is a schematic illustration of a boundary scan cell connection at a chip boundary.
Figure 3D:
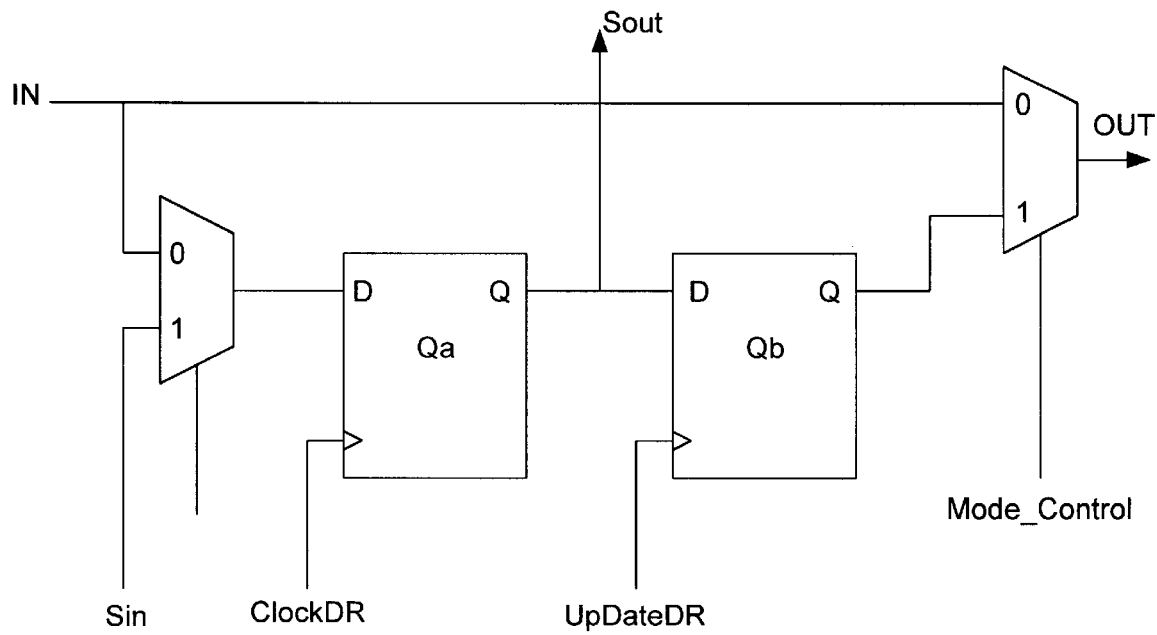
FIG. 3d is a schematic illustration of an exemplary input boundary scan cell in accordance with one aspect of the present invention.

A brief description of what port descriptions entail, etc. follows below in order to more fully appreciate the various aspects of the present invention. Typically, different types of I/O pads are used for different types of I/O pins on various circuit devices. Similarly, different boundary scan cells are used for the different type I/O pads. For example, an input pin will connect to an input type pad which, in turn, will connect to an input type boundary scan cell. An example of the above is illustrated in FIG. 3c. In addition, an exemplary input type boundary scan cell is illustrated in FIG. 3d. Providing port type information dictates which type of I/O pad is being used and will also determine which type of boundary scan cell is being utilized. Therefore by providing the port types and their respective names in a sequence, the present invention generates an HDL, for example, a VERILOG netlist, for the boundary scan chain.

For example, there may be six different types of I/O pads: input, output, tri-state output, erclk output, input-output (IO), and tri-state IO. In addition, there may be six different types of corresponding boundary scan cells which are available for use in a design library associated with the host. For a given logic block, these six types of I/O pads may exist and each of these I/O pads are connected by the present invention to the correct corresponding type of boundary scan cell. Therefore the present invention is operable to match the correct type of boundary scan cell to the appropriate I/O pad. Subsequently, the invention will link the boundary scan cells together to form a boundary scan chain.

Figure 3E:
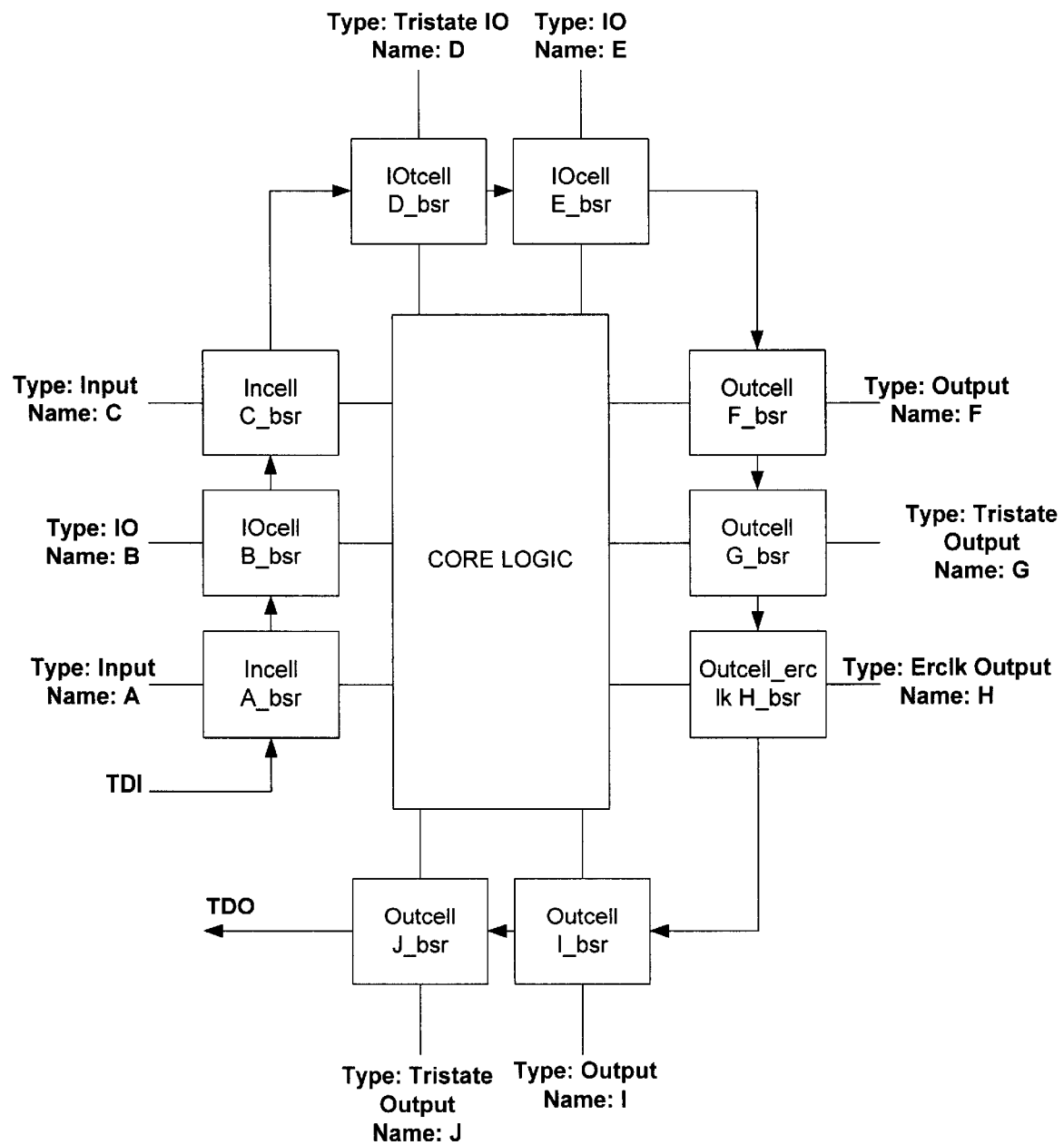
FIG. 3e is a schematic illustration of how a boundary scan chain is connected around core logic and how port information provides information relating to the type of boundary scan cell being employed.

One example of the connection of a boundary scan chain is illustrated in FIG. 3e. In FIG. 3e, the port type and name is provided; note that the sequence of the ports and their respective names are provided for purposes of illustration and thus shoudl be taken as being merely exemplary. Each boundary scan cell will have its own module name in the HDL, for example, the VERILOG netlist. In the VERILOG netlist, for example, a particular type of boundary scan cell in the host's design library will be associated with a module name. Therefore the port type and name data provided by the user (either manually or through an uploaded input file) will cause the generation of a VERILOG netlist, for example, by the port type identifying the relevant boundary scan cell type which has a VERILOG netlist module associated therewith in the host design library. An exemplary mapping illustrated in FIG. 3*f.*

Figure 3F:
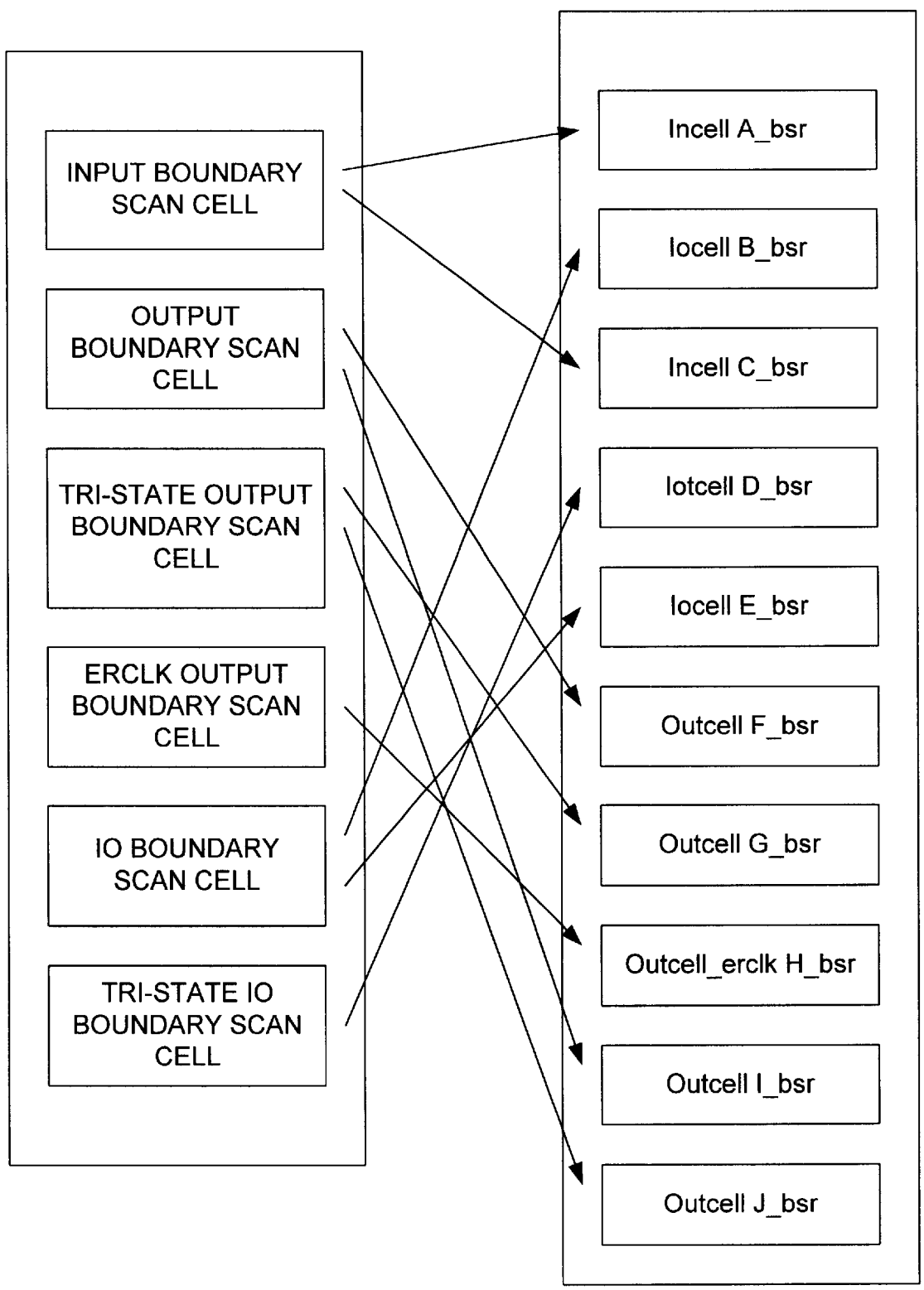
FIG. 3f is a schematic illustration of a relationship between design library cells and a boundary scan chain VERILOG netlist in accordance with one exemplary aspect of the present invention.
Figure 3G:
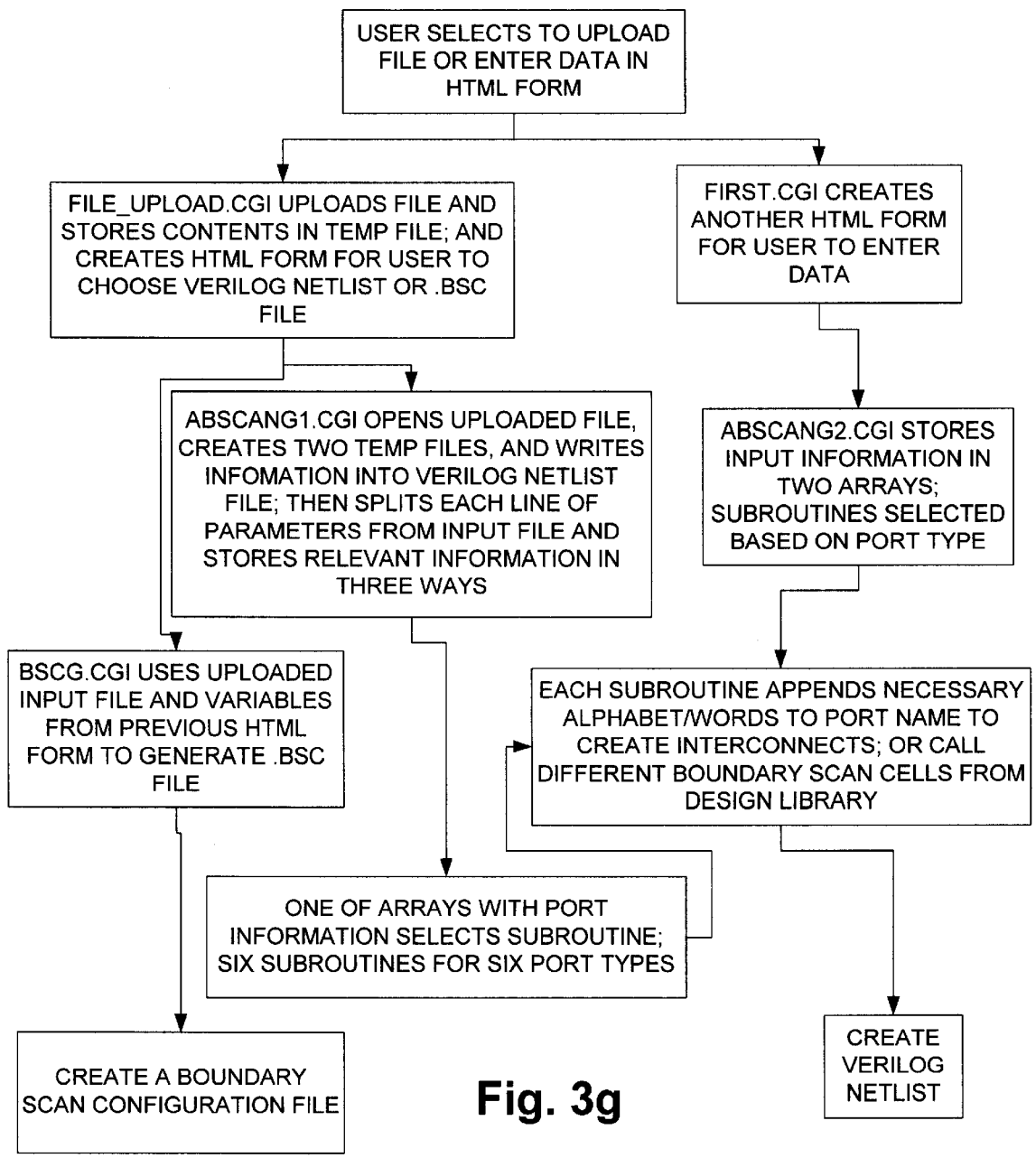
FIG. 3g is a flow chart illustration of a method for generating hardware description code in accordance with one exemplary aspect of the present invention.

From FIGS. 3*e* and 3*f,* it can be seen that according to one exemplary aspect of the present invention, the input port description information facilitates the generation of an HDL by the identification of the type of boundary scan cells being employed and such boundary scan cells calling for different pieces of HDL code in the host design library, as well as their interconnection. Exemplary source code associated therewith is provided herein at the end of the detailed description as Appendix A. An exemplary methodology for carrying out the above steps is illustrated in FIG. 3*g.*

Returning now to the webpage 370, in one aspect of the present invention, the webpage 370 may display instructions to the user, such as words describing the format of the input file 460, and show examples of the input format 465. The words 460 and examples 465 may include any information that is useful to the user for generating and uploading an input file 450 or otherwise transmitting information about the circuits. The webpage 370 may also include hyperlinks 470 that link to webpages with information about input parameter/input file format information, or any other information that is useful to the user to practice the present invention.

Figure 3H:
FIG. 3h is a schematic illustration of a webpage providing an input form in accordance with one aspect of the present invention.
Figure 3J:
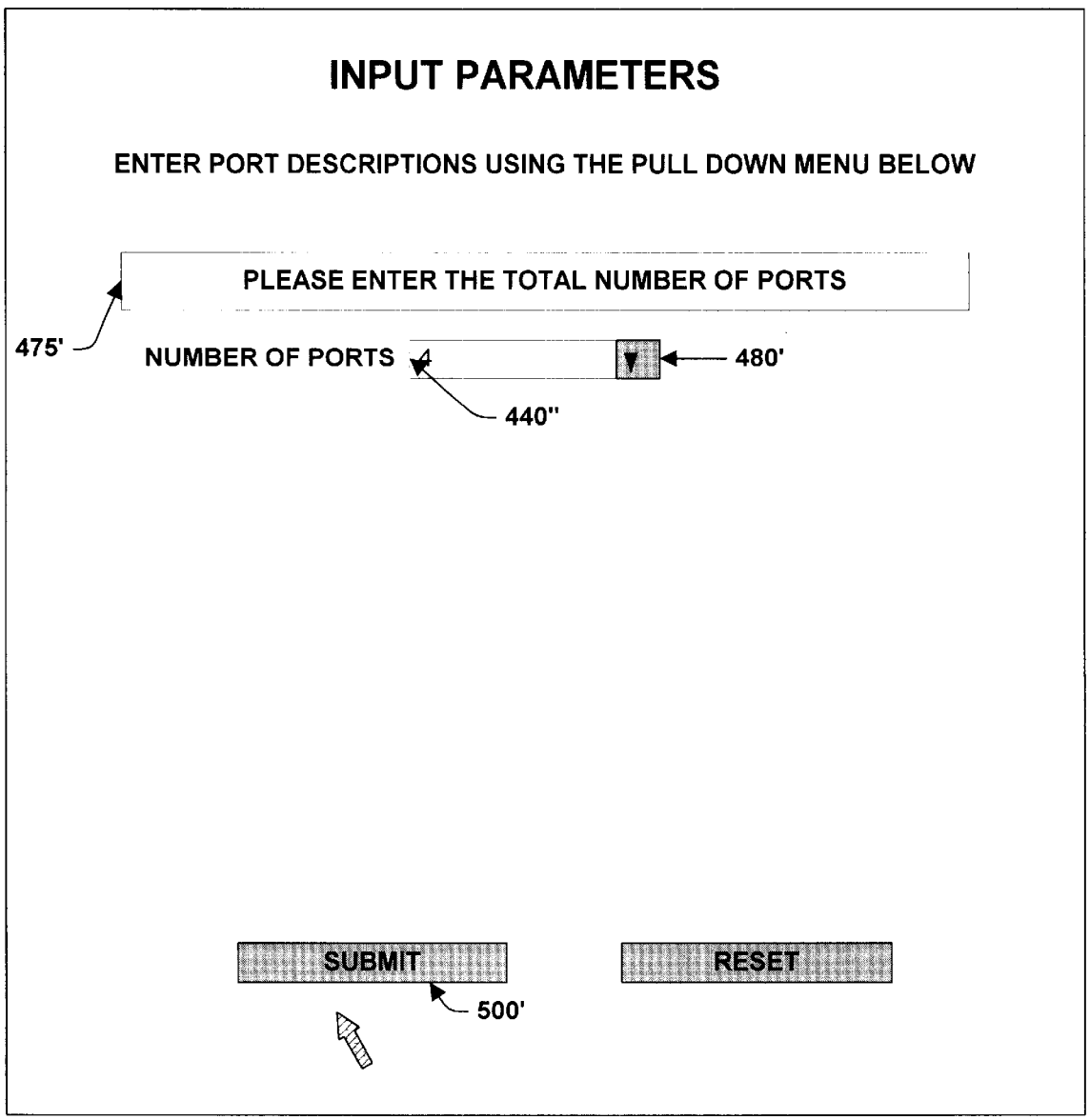
FIG. 3j is a schematic illustration of a webpage providing an input form in accordance with one aspect of the present invention.
Figure 3I:
FIG. 3i is a schematic illustration of a webpage providing an input form in accordance with one aspect of the present invention.

In another aspect of the present invention, the webpage 370' shown in FIG. 3*h* may allow the user to enter port description parameters into the fields of an HTML input form 475 as values 440', or, as shown in FIG. 3*i,* selected from a list in one or more pull down menus 480. When this information is entered or selected, the user may select the "Upload Values" button 490 in FIG. 3*h* or the "Submit" button 500 in FIG. 3*i,* for example, by clicking on the button 490 or 500 with a computer mouse (not shown). It should be appreciated that the list on the pull down menus 480 could include any number of types of input parameters that describe a circuit. In another aspect of the present invention, the user can customize the input webpages including the HTML fill in forms 475 (FIG. 3*h*) and pull down menus 480 (FIG. 3*i*).

In yet another aspect of the present invention, the pull down menus or HTML forms may be generated by a cgi script in response to an input by the user. For example, as shown in FIG. 3*j,* a webpage 370''' with an input form 475' may be displayed to the user. The input parameter value(s) 440'' can be entered by the user using a pull down menu 480' or any other HTML form, including a fill-in form (not shown). When this information is entered or selected, the user may select the "Submit" button 500' by clicking on the button 500' with a computer mouse (not shown). After the user enters or selects a value 440'', the script will generate another form 510, as shown in FIG. 3*k,* in response to the input value 440'', and display this webpage form 510 to the user. The user, in turn, may enter additional input parameters as needed. For example, the user may be asked to enter the number of ports in the device as illustrated by FIG. 3*j.* After the user inputs the number, the script generates a form, such as the form 510 as illustrated by FIG. 3*k,* which has a number of pull down menus 480'' for entering a particular feature of each port, such as the port name. The user will then be able to select the appropriate entry or value 440''' for that parameter 475'' from a list in the pull down menu 480''. Alternatively, the cgi script may generate a form with blank fields for entering the values (not shown). It will be apparent to one skilled in the art how to generate these scripts and forms from the data input by the user, for instance using a programming language such as C++.

After the user enters or uploads the input parameters, a screen 520 may be displayed to the user informing the user that the input file has been uploaded successfully as shown in FIG. 3*l.* This webpage 520 may include instructions 530 informing the user how to proceed to generate and save an HDL file. For instance, the user may be instructed to click on a button 540 to generate and save the HDL file. Alternatively, the HDL files may be generated and saved automatically from the input file without user intervention, or generation and storage of the HDL files may be accomplished in one or more steps as illustrated by the screen 520' of FIG. 3*m.*

Figure 3M:
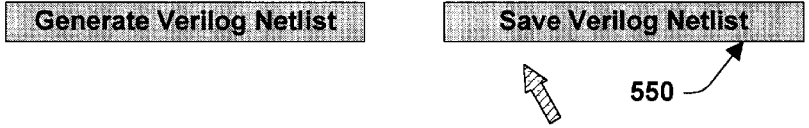
FIG. 3m is a schematic illustration of a webpage in accordance with one aspect of the present invention.

The HDL files are generated from the input data, typically by a script that is adapted to perform the function of generating HDL files from various input parameters. After the HDL files are generated, the user may save the files created from the input data, for instance by clicking on the "Save" button 550 as illustrated in FIG. 3*m.* The HDL files created may be saved on the hardware description code generation server for downloading at a later time, or may be downloaded to the user's system immediately. Saving a file includes writing a file to magnetic media, or any other data storage media suitable for storing electronic files. Alternatively, the user may choose to download the files immediately. It will be appreciated that the files that are created by the present invention include hardware description language (HDL) files, such as BSC files, BSDL files, and VERILOG netlists, or any other file that describes a circuit.

Figure 4:
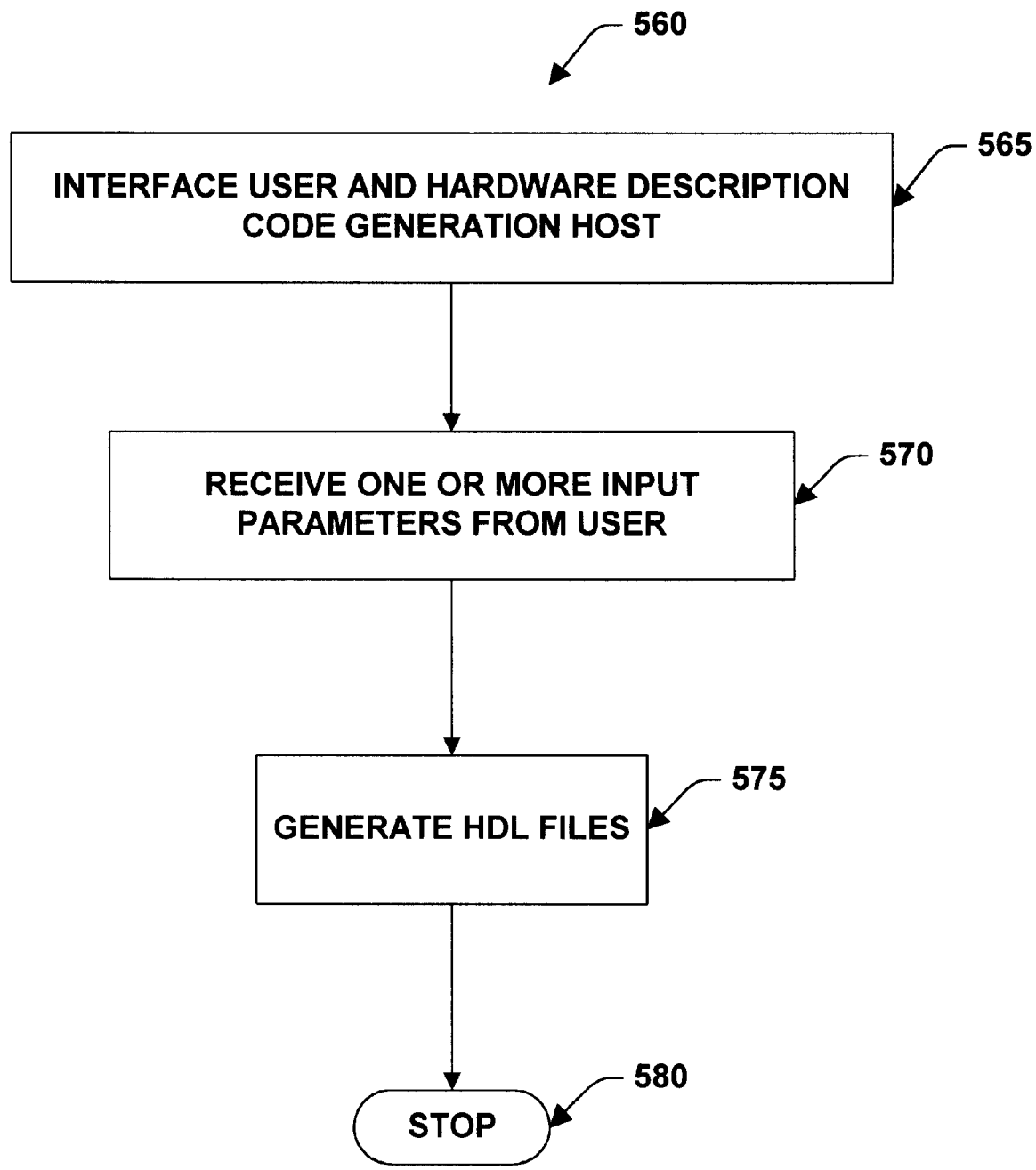
FIG. 4 illustrates a flow chart for an Internet hardware description code generation method in accordance with one aspect of the present invention.

Turning now to FIG. 4, a flowchart illustrates a method 560 for generating an Internet hardware description code. The method begins at step 565 in which a user and a hardware description code generation host are interfaced. In step 570, the hardware description code generation host receives one or more input parameters that describe a circuit from the user. In step 575, one or more hardware description language (HDL) files are generated from the one or more input parameters received from the user. The HDL file may be a VERILOG netlist, a BSC file, a VHDL file, a BSDL file, or a file in any format or language suitable for describing circuits. It is to be appreciated that the term "VERILOG" encompasses all versions of VERILOG, including OVI and those promulgated by IEEE standard 1364. It is to be appreciated that the HDL files generated by the host can be in an electronic format. It will also be appreciated that any means of storing data may be used in the present invention to store the HDL descriptions, such as magnetic media, optical storage media, RAM, ROM, etc.

Step 575 typically will be implemented by a script that is adapted to generate HDL files from input parameters. Scripts include common gateway interface (cgi) scripts. A cgi script comprises a software program designed to accept and return data that adheres to the cgi specification. Cgi is a specification for transferring information between a www server and a cgi script. The cgi program may be written in any programming language, including higher level languages such as C++, Perl, Java, ActiveX, or Visual Basic. HTML pages that contain forms may use a cgi program to process the form's data. The scripts of the present invention may be implemented by any suitable manner, including loading the memory of a computer with a software program that implements an algorithm for converting the input parameters to HDL files. The user may operatively interface with the script over the Internet, or alternatively, by any suitable means such as dedicated data lines, PCS, microwave, satellite networks, wireless telephone, or locally such as by a local area network or desktop computer.

In general, the input parameters will describe one or more circuits, and include information such as port descriptions. The circuit may be an IEEE standard 1149.1 compliant device, a device that includes at least one boundary scan cell, at least one test access port controller, at least one bypass register, and at least one instruction register, a device that includes at least one boundary scan chain, or any other device. The process stops in step 580.

Figure 5:
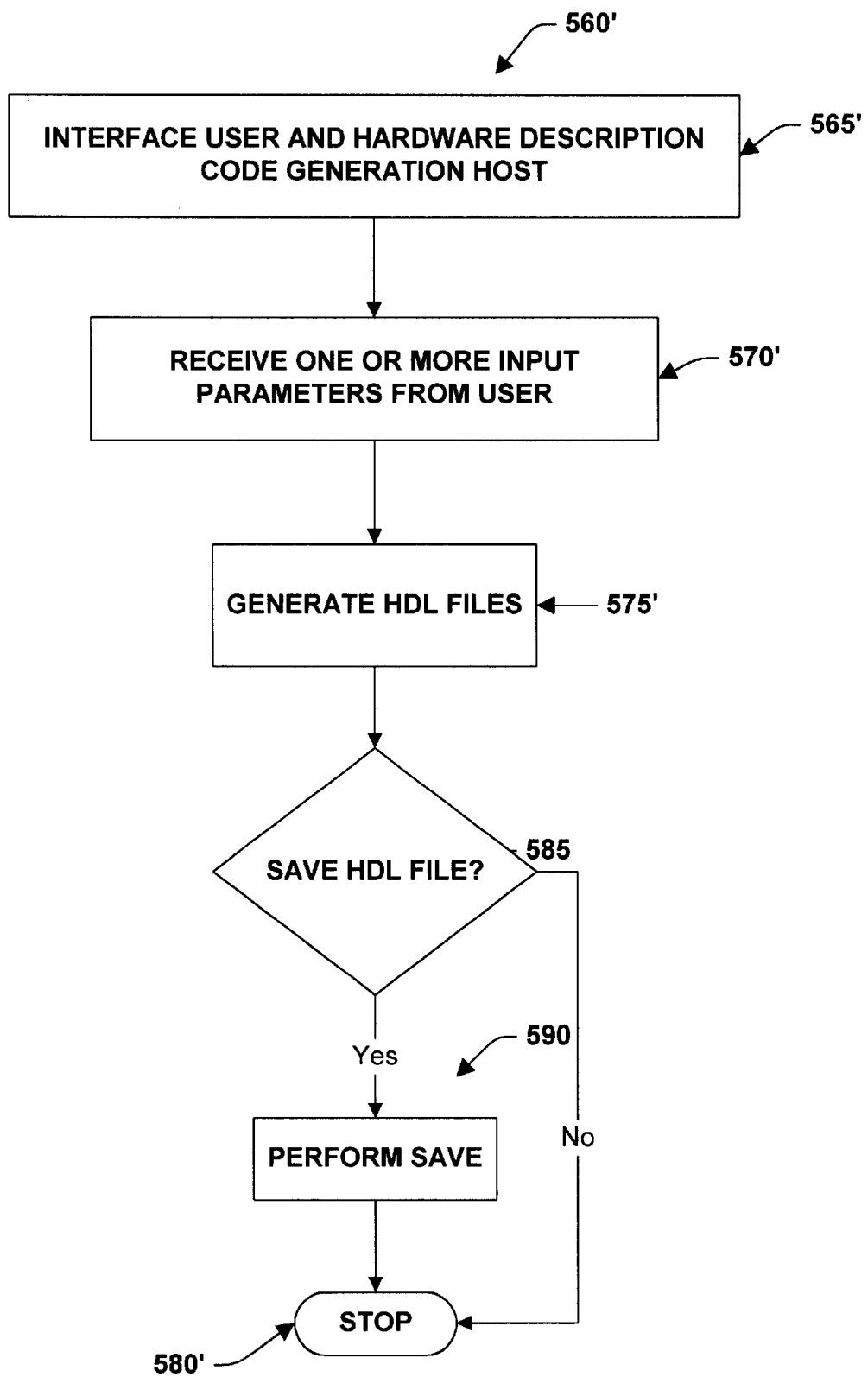
FIG. 5 illustrates a flow chart for an Internet hardware description code generation method in accordance with one aspect of the present invention.

In accordance with another aspect of the present invention, an additional step 585 may be performed as shown in FIG. 5. In step 585, the user may decide whether to save the generated files or download the generated files. For instance, a webpage may be displayed to the user prompting the user to indicate whether the user desires to save the HDL files on the server or to download the files to the user's system immediately or at a later time. This may be accomplished, for example, by clicking a button on the webpage and then entering the path and file name on the user's system where the HDL file is to be stored. The files of the present invention may be stored on any data storage media suitable for storing electronic data, e.g., magnetic media, optical storage media, RAM, ROM, etc. If the HDL file is to be stored, (YES), then a save is performed, for instance the HDL file is stored on the server or downloaded to the user, and the process stops (step 580'). If, however, at step 585 it is indicated that a save is not desired (NO), then the method proceeds to step 580' and the process stops.

Figure 6:
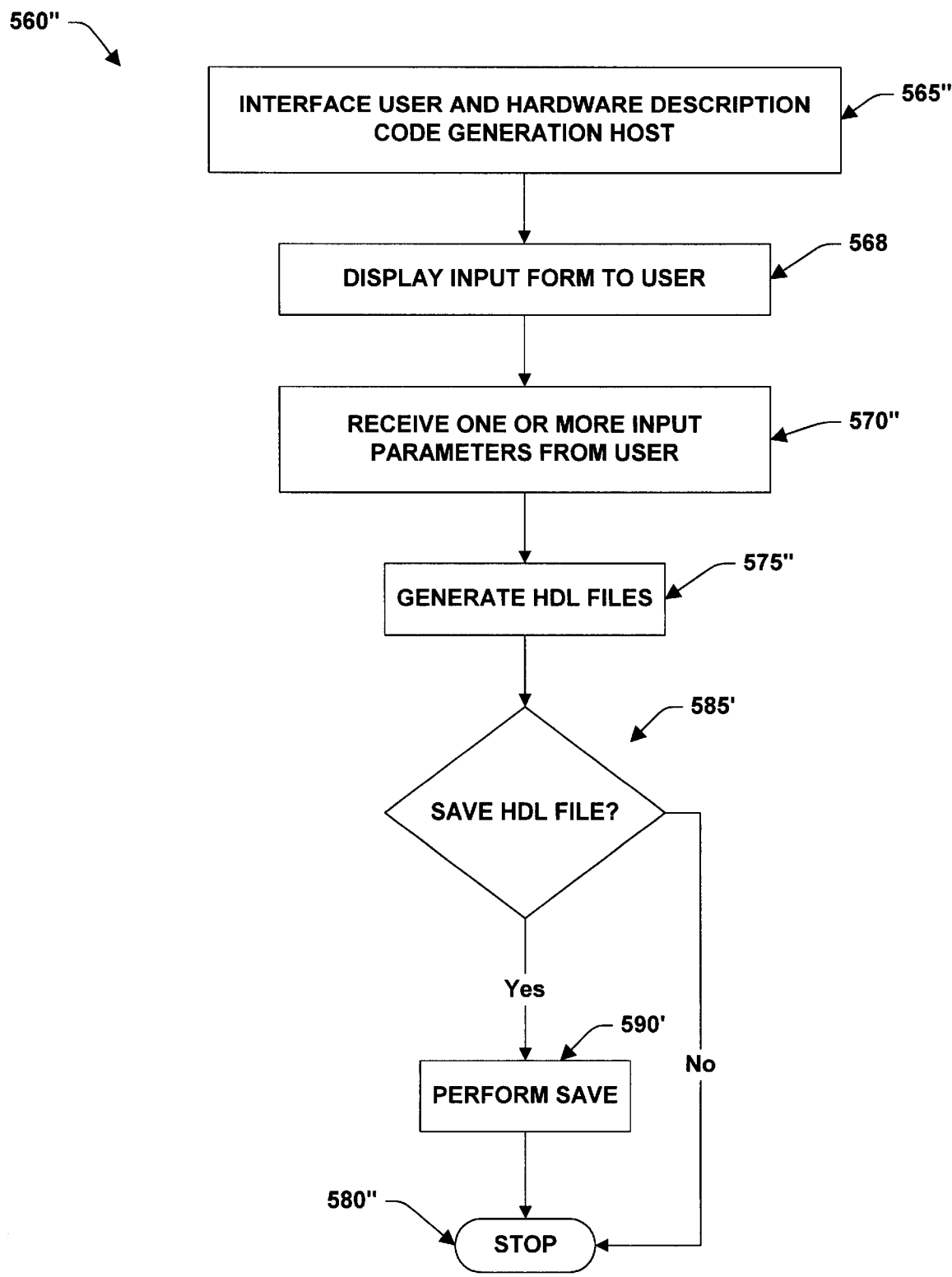
FIG. 6 illustrates a flow chart for an Internet hardware description code generation method in accordance with one aspect of the present invention.

Turning now to FIG. 6, a flowchart illustrates a method 560" for generating an Internet hardware description code. The method begins at step 565" in which a user and a hardware description code generation host are interfaced. In step 568, an input form is displayed to the user, such that the user can enter or upload input parameters that describe a circuit to the hardware description code generation host. The input parameters include any information that can describe a circuit, such as port descriptions. The input form may be, for example, an HTML input form with fields for entering input parameter values or a form with pull down menus in which the input parameter values may be selected from a list. It should be appreciated that the fields and lists of the input forms may include any number of types of input parameters that describe a circuit. In accordance with another aspect of the present invention, the user can customize the input forms that are to be displayed. In step 570", the hardware description code generation host receives the one or more input parameters from the user. In step 575", one or more hardware description language files are generated from the one or more input parameters received from the user. Step 575" typically will be implemented by a script that is adapted to generate HDL files from input parameters. In general, these input parameters will describe one or more circuits, and include information such as port descriptions.

In step 585', the user may decide whether to save the generated files or download the generated files. For instance, a webpage may be displayed to the user prompting the user to indicate whether the user desires to save the HDL files on the server or to download the files to user's system immediately or at a later time. This may be accomplished, for example, by clicking a button on the webpage and then entering the path and file name on the user's system where the HDL file is to be stored. The files of the present invention may be stored on any data storage media suitable for storing electronic data, e.g., magnetic media, optical storage media, RAM, ROM, etc. If the HDL file is to be stored, (YES), then a save is performed, for instance the HDL file is stored on the server or downloaded to the user, and the process stops (step 580"). If, however, at step 585' it is indicated that a save is not desired (NO), then the method proceeds to step 580" and the process stops.

Figure 7:
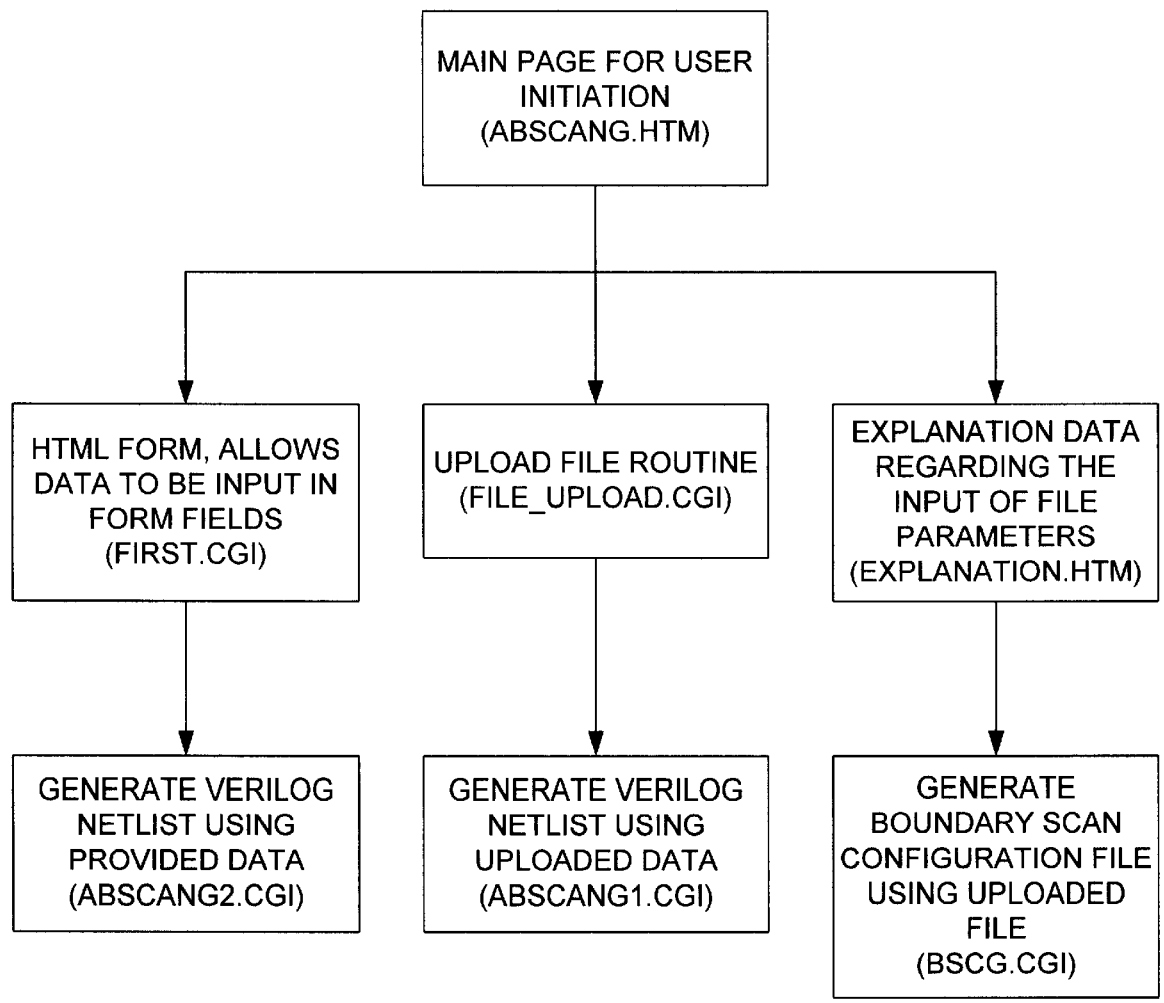
FIG. 7 is a flow chart illustrating various acts and subroutines in accordance with the present invention.

As discussed above in general terms, the present invention relates to a system and method of generating HDL files in a simple and reliable manner using a network facility, for example, the Internet. An overall exemplary operation and flow of the present invention is illustrated in the flow chart of FIG. 7, wherein various steps and exemplary subroutines may be executed. Exemplary source code for the exemplary subroutines is provided at the end of the detailed description of the present invention as Appendix B.

Alternatively, the scripts, webpages, systems, and methods of the present invention may be implemented via object oriented programming techniques. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors which the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization. The present invention also employs abstract classes, which are designs of sets of objects that collaborate to carry out a set of responsibilities. Frameworks are essentially groups of interconnected objects and classes that provide a prefabricated structure for a working application.

In one aspect of the present invention, Java and CORBA (Common Object Request Broker Architecture) are employed. Java is an object-oriented, distributed, secure, architecture neutral language. Java provides for object-oriented design which facilitates the clean definition of interfaces and makes it possible to provide reusable "software ICs." Java has an extensive library of routines for copying easily with TCP/IP protocols like HTTP and FTP. Java applications can open and access objects across a network via URLs with the same ease to which programmers are accustomed to accessing a local file system.

Furthermore, Java utilizes "references" in place of a pointer model and so eliminates the possibility of overwriting memory and corrupting data. Instead of pointer arithmetic that is employed in many conventional systems, the Java "virtual machine" mediates access to Java objects (attributes and methods) in a type-safe way. In addition, it is not possible to turn an arbitrary integer into a reference by casting (as would be the case in C and C++ programs). In so doing, Java enables the construction of virus-free, tamper-free systems. The changes to the semantics of references make it virtually impossible for applications to forge access to data structures or to access private data in objects that they do not have access to. As a result, most activities of viruses are precluded from corrupting a Java system.

Java affords for the support of applications on networks. Networks are composed of a variety of systems with a variety of CPU and operating system architectures. To enable a Java application to execute anywhere on the network, a compiler generates an architecture neutral object file format—the compiled code is executable on many processors, given the presence of the Java runtime system. Thus, Java is useful not only for networks but also for single system software distribution. In the present personal computer market, application writers have to produce versions of their applications that are compatible with the multiple operating system platforms. However, with Java, the same version of the application runs on all platforms. The Java compiler accomplishes this by generating byte code instructions which have nothing to do with a particular computer architecture. Rather, they are designed to be both easy to interpret on any machine and easily translated into native machine code on the fly.

Being architecture neutral, the "implementation dependent" aspects of the system are reduced or eliminated. The Java virtual machine (VM) can execute Java byte codes directly on any machine to which the VM has been ported. Since linking is a more incremental and lightweight process, the development process can be much more rapid and exploratory. As part of the byte code stream, more compile-time information is carried over and available at runtime.

Thus, the use of Java in the present invention provides a server to send programs over the network as easily as traditional servers send data. These programs can display and manipulate data on a client computer. The present invention through the use of Java supports execution on multiple platforms. That is the same programs can be run on substantially all computers regardless of the operating system platform of the computer. To effect such multi-platform support, a network adapter and a network browser (not shown) such as Netscape Navigator or Microsoft Internet Explorer may be used in the present invention. It should be appreciated, however, that a Java stand-alone application may be constructed to achieve a substantially equivalent result. Although the present invention is described with respect to employing Java, it will be appreciated that any suitable programming language may be employed to carry out the present invention.

An Internet browser (e.g., Netscape, Microsoft Internet Explorer) is held within the memory of the client computer. The Internet browser enables a user to explore the Internet and view documents from the Internet. The Internet browser may include client programs for protocol handlers for different Internet protocols (e.g., HTTP, FTP and Gopher) to facilitate browsing using different protocols. It is to be appreciated that any programming methodology and/or computer architecture suitable for carrying out the present invention may be employed and are intended to fall within the scope of the hereto appended claims.

What has been described above are several aspects and embodiments of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

Although the invention has been shown and described with respect to certain embodiments, equivalent alterations and modifications will occur to others skilled in the art upon the reading and understanding of this specification and the annexed drawings. In particular regard to the various functions performed by the above described components (systems, devices, assemblies, etc.), the terms used to describe such components are intended to correspond, unless otherwise indicated, to any component which performs the specified function of the described component (i.e., that is functionally equivalent), even though not structurally equivalent to the disclosed structure that performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application. Furthermore, to the extent that the term "includes" is used in either the detailed description and the claims, such term is intended to be inclusive in a manner similar to the term "comprising."

We claim:

1. An Internet hardware description code generation system comprising:

a hardware description code generation host, the hardware description code generation host adapted to generate one or more hardware description language files in response to one or more input parameters received by the hardware description code generation host, the one or more input parameters describing a circuit, wherein the one or more input parameters include one or more port descriptions provided by a user.

2. The Internet hardware description code generation system of claim 1, wherein the one or more input parameters are received by the hardware description code generation host via an Internet in accordance with the one or more port descriptions provided by the user.

3. The Internet hardware description code generation system of claim 1, wherein the hardware description code generation host is a computer.

4. The Internet hardware description code generation system of claim 1, wherein the hardware description code generation host utilizes at least one script for generating the one or more hardware description language files.

5. The Internet hardware description code generation system of claim 1, wherein an input format for inputting the one or more input parameters is displayed to a user substantially simultaneously as the user inputs the input parameters to the hardware description code generation host.

6. The Internet hardware description code generation system of claim 1, wherein an input format for inputting the one or more input parameters is pre-defined.

7. The Internet hardware description code generation system of claim 1, wherein the hardware description code generation host utilizes at least one script for customizing an input form for inputting the one or more input parameters.

8. The Internet hardware description code generation system of claim 7, wherein the input form for inputting the one or more input parameters is customized by a user.

9. The Internet hardware description code generation system of claim 8, wherein the input form for inputting the one or more input parameters is an HTML form.

10. The Internet hardware description code generation system of claim 1, wherein the circuit described includes at least one device that substantially complies with IEEE standard 1149.1.

11. The Internet hardware description code generation system of claim 1, wherein the circuit described includes at least one boundary scan cell, at least one test access port controller, at least one bypass register, and at least one instruction register.

12. The Internet hardware description code generation system of claim 1, wherein the circuit described includes at least one boundary scan chain.

13. The Internet hardware description code generation system of claim 1, wherein at least one of the one or more hardware description language files generated is a VERILOG netlist.

14. The Internet hardware description code generation system of claim 1, wherein at least one of the one or more hardware description language files generated is a boundary scan configuration file.

15. The Internet hardware description code generation system of claim 1, wherein at least one of the one or more hardware description language files generated is in VHSIC Hardware Description Language.

16. The Internet hardware description code generation system of claim 1, wherein at least one of the one or more hardware description language files generated is in Boundary Scan Description Language.

17. The Internet hardware description code generation system of claim 1, wherein at least one of the one or more hardware description language files generated is in VERILOG.

18. A hardware description language file generated by the Internet hardware description code generation system of claim 1.

19. An Internet hardware description code generation method, comprising:

interfacing a user and a hardware description code generation host, the hardware description code generation host receiving one or more input parameters describing a circuit from a user, wherein the one or more input parameters include one or more port descriptions; and generating one or more hardware description language files from the one or more input parameters received from the user.

20. The Internet hardware description code generation method of claim 19, wherein the user and the hardware description code generation host are interfaced via an Internet.

21. The Internet hardware description code generation method of claim 19, wherein the user downloads the one or more hardware description language files from the hardware description code generation host.

22. The Internet hardware description code generation method of claim 19, further comprising storing the one or more hardware description language files on data storage media.

23. The Internet hardware description code generation method of claim 19, wherein the hardware description code generation host includes data storage media for storing the hardware description language files.

24. The Internet hardware description code generation method of claim 19, wherein the hardware description code generation host utilizes at least one script for generating the one or more hardware description language files.

25. The Internet hardware description code generation method of claim 19, further comprising displaying to the user an input format for inputting the one or more input parameters substantially simultaneously as the user inputs the input parameters.

26. The Internet hardware description code generation method of claim 19, further comprising pre-defining an input format for inputting the one or more input parameters.

27. The Internet hardware description code generation method of claim 19, further comprising customizing a form for inputting the one or more input parameters.

28. The Internet hardware description code generation method of claim 27, wherein the input form for inputting the one or more input parameters is customized by a user.

29. The Internet hardware description code generation method of claim 28, wherein the input form for inputting the one or more input parameters is in HTML format.

30. The Internet hardware description code generation method of claim 19, wherein the circuit described includes at least one device that substantially complies with IEEE standard 1149.1.

31. The Internet hardware description code generation method of claim 19, wherein the circuit described includes at least one boundary scan cell, at least one test access port controller, at least one bypass register, and at least one instruction register.

32. The Internet hardware description code generation method of claim 19, wherein the circuit described includes at least one boundary scan chain.

33. The Internet hardware description code generation method of claim 19, wherein at least one of the one or more hardware description language files generated is chosen from a group consisting of a VERILOG netlist, a boundary scan configuration file, and a VHSIC Hardware Description Language file.

34. The Internet hardware description code generation method of claim 19, wherein the hardware description code generation host is a computer.

35. The Internet hardware description code generation method of claim 34, wherein the user uses a computer to link to the hardware description code generation host via an Internet to upload the one or more input parameters to the hardware description code generation host.

36. A hardware description language file generated by the Internet hardware description code generation method of claim 19.

* * * * *